(12) United States Patent
Cho

(10) Patent No.: US 11,346,668 B2
(45) Date of Patent: May 31, 2022

(54) SYSTEM AND METHOD FOR MICRO-SCALE MACHINING

(71) Applicant: ENERTIA MICROSYSTEMS INC., Ann Arbor, MI (US)

(72) Inventor: Jae Yoong Cho, Ann Arbor, MI (US)

(73) Assignee: ENERTIA MICROSYSTEMS INC., Ann Arbor, MI (US)

( * ) Notice: Subject to any disclaimer, the term of this patent is extended or adjusted under 35 U.S.C. 154(b) by 0 days.

(21) Appl. No.: 17/118,919

(22) Filed: Dec. 11, 2020

(65) Prior Publication Data

US 2021/0180951 A1    Jun. 17, 2021

Related U.S. Application Data

(60) Provisional application No. 62/947,266, filed on Dec. 12, 2019.

(51) Int. Cl.
*G01C 19/5691* (2012.01)
*G01C 19/5776* (2012.01)
*G01C 25/00* (2006.01)

(52) U.S. Cl.
CPC ..... *G01C 19/5691* (2013.01); *G01C 19/5776* (2013.01); *G01C 25/00* (2013.01)

(58) Field of Classification Search
CPC . G01C 19/5691; G01C 19/5776; G01C 25/00
See application file for complete search history.

(56) References Cited

U.S. PATENT DOCUMENTS

| | | | | |
|---|---|---|---|---|
| 3,625,067 A | * | 12/1971 | Emslie | G01C 19/5691 73/504.13 |
| 3,656,354 A | * | 4/1972 | Lynch | G01C 19/5691 73/504.13 |
| 3,680,391 A | * | 8/1972 | Denis | G01C 19/5691 73/504.13 |
| 4,644,793 A | * | 2/1987 | Church | G01C 19/5691 73/504.13 |
| 4,793,195 A | * | 12/1988 | Koning | G01C 19/5691 73/504.13 |

(Continued)

*Primary Examiner* — David J Bolduc
(74) *Attorney, Agent, or Firm* — Dickinson Wright PLLC

(57) ABSTRACT

A method of adjusting an operating parameter of a miniature electromechanical resonator comprises measuring angular coordinates of first and second principal stiffness axes of first and second wine-glass mode of the miniature electromechanical resonator, respectively; determining first and second wine-glass mode frequencies of the resonator being resonant frequencies of the first and second principal stiffness axes, respectively; calculating one or more locations on the resonator for machining to reduce a difference between the first and second wine-glass mode frequencies; and machining the one or more locations on the resonator to reduce the difference between the first and second wine-glass mode frequencies. An apparatus for adjusting an operating parameter of a miniature electromechanical resonator comprises a vibration actuator/detector configured to measure the locations of the first and second principal stiffness axes, and a micro-machining apparatus to add or remove material from the resonator for adjusting the operating parameter thereof.

20 Claims, 15 Drawing Sheets

(56) References Cited

U.S. PATENT DOCUMENTS

| | | | | |
|---|---|---|---|---|
| 4,951,508 A * | 8/1990 | Loper, Jr. | G01C 19/5691 | 73/1.84 |
| 5,445,007 A * | 8/1995 | Varnham | G01C 19/5691 | 73/1.37 |
| 5,629,472 A * | 5/1997 | Varnham | G01C 19/5691 | 310/312 |
| 5,712,427 A * | 1/1998 | Matthews | G01C 19/5691 | 73/1.37 |
| 5,915,276 A * | 6/1999 | Fell | G01C 19/5677 | 73/504.13 |
| 5,969,465 A * | 10/1999 | Neukermans | B81B 3/0078 | 310/333 |
| 9,866,172 B2 * | 1/2018 | Nguyen | H01P 1/39 | |
| 9,879,997 B1 * | 1/2018 | Kubena | G01C 19/5684 | |
| 10,422,641 B1 * | 9/2019 | Perahia | G01C 19/5691 | |
| 2006/0037417 A1 * | 2/2006 | Shcheglov | G01C 19/5684 | 74/5.4 |
| 2006/0266116 A1 * | 11/2006 | Chikovani | G01C 19/5691 | 73/504.02 |
| 2008/0184798 A1 * | 8/2008 | Yatzenko | G01C 19/5691 | 73/504.12 |
| 2009/0031832 A1 * | 2/2009 | Choi | G01C 19/5691 | 74/5.6 D |
| 2010/0154542 A1 * | 6/2010 | Okon | G01C 19/5691 | 73/504.12 |
| 2013/0104653 A1 * | 5/2013 | Bernstein | G01C 19/5691 | 73/504.13 |
| 2015/0192415 A1 * | 7/2015 | Ge | G01C 19/5684 | 73/504.13 |
| 2016/0003618 A1 * | 1/2016 | Boser | G01C 19/5755 | 73/504.12 |
| 2016/0047653 A1 * | 2/2016 | Shkel | B81C 1/00238 | 73/504.13 |
| 2016/0109258 A1 * | 4/2016 | Boser | G01C 19/5726 | 73/504.12 |
| 2016/0334214 A1 * | 11/2016 | Saito | G01C 19/5691 | |
| 2018/0245946 A1 * | 8/2018 | Weinberg | G01C 19/5684 | |
| 2021/0348923 A1 * | 11/2021 | Beitia | G01C 19/5691 | |

* cited by examiner

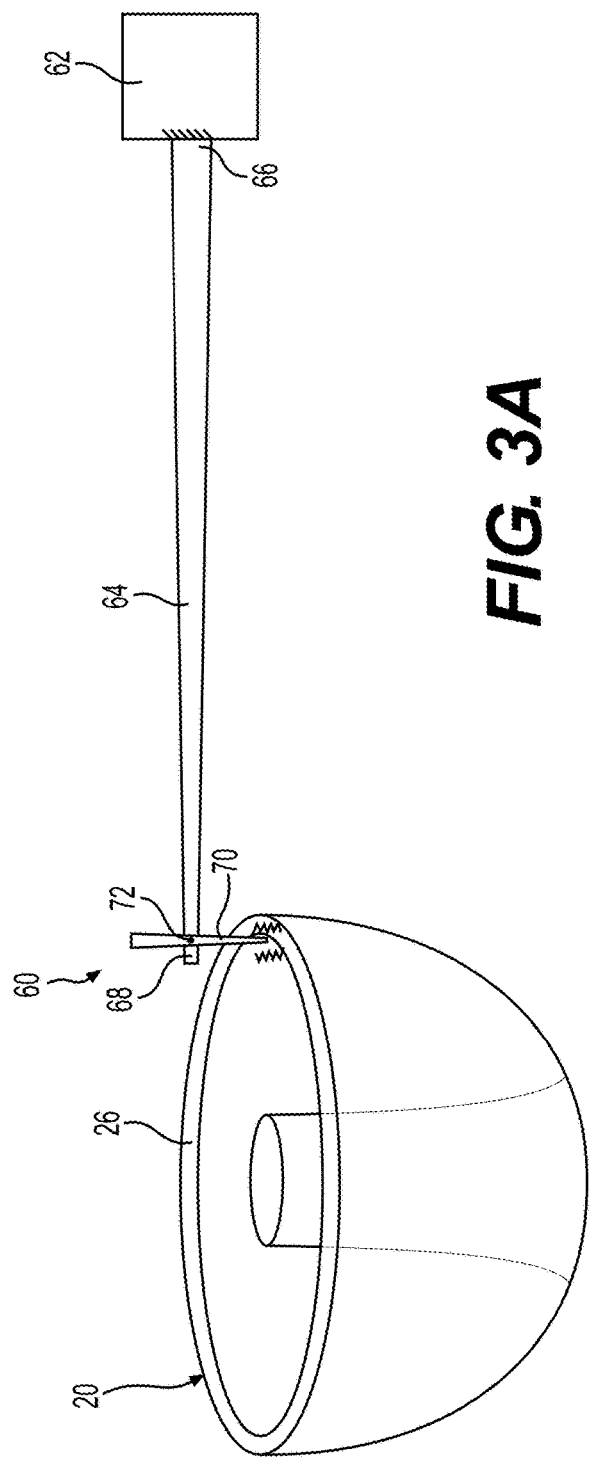
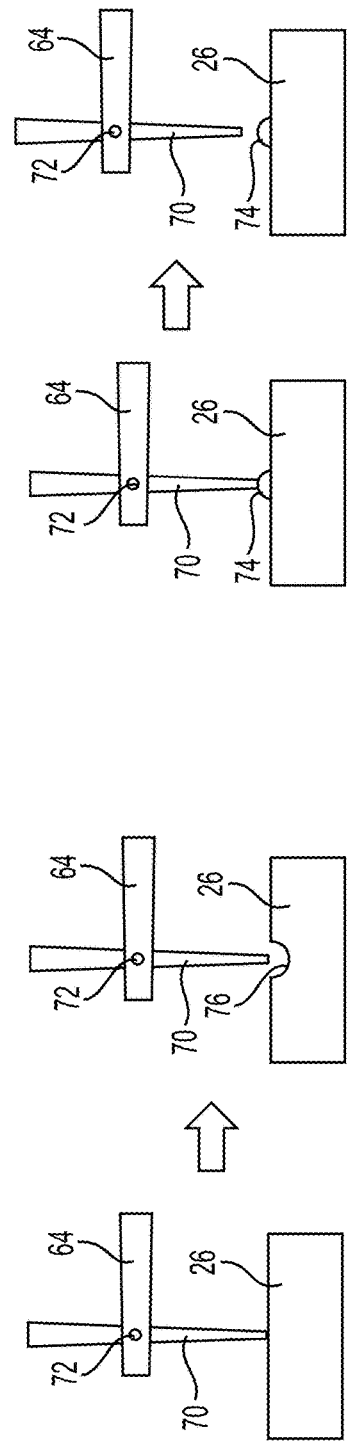
FIG. 3A
FIG. 3B
FIG. 3C

SYSTEM AND METHOD FOR MICRO-SCALE MACHINING

CROSS-REFERENCE TO RELATED APPLICATIONS

This Utility patent application claims the benefit of U.S. Provisional Patent Application Ser. No. 62/947,266 filed on Dec. 12, 2019, and titled "System and Method for Micro-Scale Machining", the entire disclosure of which is hereby incorporated by reference.

BACKGROUND

Miniature electromechanical resonators are used in a variety of applications. One such application is in a miniature vibratory gyroscope having a symmetric mechanical resonator. Examples of such devices include University of Michigan's Birdbath Resonator Gyroscope (BRG), Northrop Grumman's Hemispherical Resonator Gyroscope (HRG), Safran's Hemispherical Resonator Gyroscope (HRG), Innalab's cylindrical resonator gyroscope, Watson's cylinder resonator gyroscope, Boeing's disk resonator gyroscope, and Silicon Sensing System's vibratory ring gyroscope. A common feature of these vibratory gyroscopes is that they each include a mechanical resonator vibrating in a flexural mode, also called a wine-glass mode.

The sensitivity, angle random walk, and bias stability of a vibratory gyroscope strongly depend on the difference between two wine-glass mode frequencies and the mechanical quality factor (Q) of the two wine-glass modes. In order to maximize sensitivity, minimize noise, and minimize bias drift of the gyroscope, the frequencies of the two wine-glass modes need to be matched, and the Q of the two wine-glass modes needs to be maximized.

SUMMARY

The present disclosure provides a method of adjusting an operating parameter of a miniature electromechanical resonator. The method comprises: measuring an angular coordinate of a first principal stiffness axis of a first wine-glass mode of the miniature electromechanical resonator; measuring an angular coordinate of a second principal stiffness axis of a second wine-glass mode of the miniature electromechanical resonator; determining a first wine-glass mode frequency of the miniature electromechanical resonator being a resonant frequency of the first principal stiffness axis; determining a first wine-glass mode frequency of the miniature electromechanical resonator being a resonant frequency of the second principal stiffness axis; calculating one or more locations on the miniature electromechanical resonator for machining to reduce a difference between the first and second wine-glass mode frequencies of the miniature electromechanical resonator; and machining the one or more locations on the miniature electromechanical resonator to reduce the difference between the first and second wine-glass mode frequencies of the miniature electromechanical resonator.

The present disclosure also provides an apparatus for adjusting an operating parameter of a miniature electromechanical resonator. The apparatus comprises a vibration actuator/detector configured to measure locations of a first principal stiffness axis and a second principal stiffness axis of the miniature electromechanical resonator, and to measure wine-glass mode frequencies corresponding to each of the first and second principal stiffness axes. The apparatus also comprises a micro-machining apparatus configured to add or remove material from the miniature electromechanical resonator to adjust the operating parameter of the miniature electromechanical resonator.

BRIEF DESCRIPTION OF THE DRAWINGS

Further details, features, and advantages of designs of the invention result from the following description of embodiment examples in reference to the associated drawings.

FIG. 3A shows a profile view of a micro-machining apparatus in operation machining a rim of a miniature electromechanical resonator;

FIG. 3B illustrates removal of material from the rim of the miniature electromechanical resonator by the micro-machining apparatus;

FIG. 3C illustrates addition of material to the rim of the miniature electromechanical resonator by the micro-machining apparatus;

DETAILED DESCRIPTION

1. Overview

Figure 1:
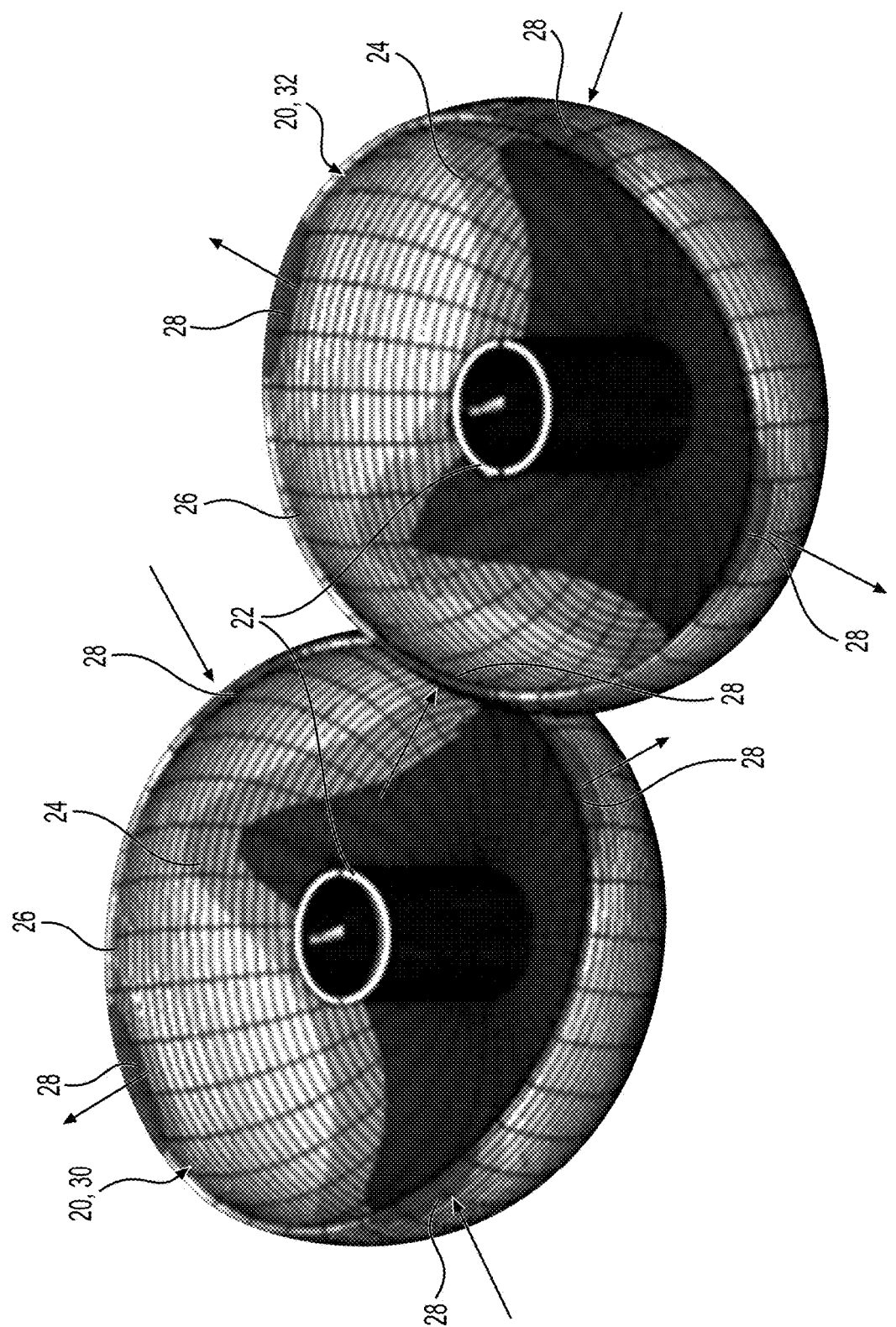
FIG. 1 shows displacement patterns of a miniature electromechanical resonator vibrating in each of two n=2 wine-glass modes.

Referring to the drawings, the present invention will be described in detail in view of following embodiments, in which methods and apparatuses for adjusting an operating parameter of a miniature electromechanical resonator is disclosed.

Specifically, a mathematical calculation method for calculating important parameters of a mechanical resonance mode, a micro-machining process, and micro-machining apparatuses are disclosed. The mathematical calculation method is used to calculate the orientations of the antinodes and the principal stiffness axes of the flexural mechanical resonance modes (a.k.a. wine-glass mode) as well as frequencies of the individual principal stiffness axes. The micro-machining method can precisely remove from or add to surfaces of a miniature device to change its stiffness, mass, resonance frequency, and mechanical quality factor (Q). Micro-machining apparatuses automatically determine the principal stiffness axes of a miniature device and automatically machine its geometries to change (or trim) its mechanical resonance mode frequencies to desired values. Batch processing of a plurality of miniature electromechanical resonators is also provided. The present disclosure also provides a micro fabrication process steps for containing the invented micro-machining process.

The inventions that we disclose here are useful for fabricating a variety of micro-scale sensors and actuators. An example of a device that the technology could be used is a miniature vibratory gyroscope having a symmetric mechanical resonator. Examples of such devices include University of Michigan's Birdbath Resonator Gyroscope (BRG), Northrop Grumman's Hemispherical Resonator Gyroscope (HRG), Safran's Hemispherical Resonator Gyroscope (HRG), Innalab's cylindrical resonator gyroscope, Watson's cylinder resonator gyroscope, Boeing's disk resonator gyroscope, and Silicon Sensing System's vibratory ring gyroscope. A common feature of these vibratory gyroscopes is that the mechanical resonator is vibrating in the flexural mode, also called the wine-glass mode. The displacement patterns of a mechanical resonator of a three-dimensional shell mechanical resonator is shown in FIG. 1. The sensitivity, angle random walk, and bias stability of a vibratory gyroscope strongly depend on the difference of the two wine-glass mode frequencies and the mechanical quality factor (Q) of the two wine-glass modes. In order to maximize the sensitivity, minimize the noise, and minimize the bias drift of the gyroscope, the frequencies of the two wine-glass modes need to be matched, and the Q of the two resonance modes needs to be maximized. The wine-glass mode frequencies of a gyroscope can be automatically matched at high speed and at low cost using a method and/or apparatus of the present disclosure. The methods and apparatuses of the present disclosure can also be used to make a wide variety of micro- and nano-scale electro-mechanical sensors and actuators such as timing devices, chemical sensors, biological sensors, and optical sensors.

FIG. 1 shows displacement patterns of a miniature electromechanical resonator 20 vibrating in each of two n=2 wine-glass modes. The miniature electromechanical resonator 20 may be referred to herein as a "resonator" for short. Specifically, FIG. 1 shows the resonator 20 vibrating in a first wine-glass mode 30, and the resonator 20 vibrating in a second wine-glass mode 32. More specifically, FIG. 1 shows the resonator 20 in the form of a birdbath shell resonator having a cylindrically shaped anchor 22 surrounded by a hemispherical body 24 defining a circular-shaped rim 26. Each of the wine-glass modes 30, 32 of the two n=2 wine-glass modes includes four antinodes 28 as regions of the rim 26 having a local maximum of deflection.

The birdbath shell resonator 20 is merely an example, and the methods and apparatuses of the present disclosure may be applied to other resonators, such as devices used in Northrop Grumman's Hemispherical Resonator Gyroscope (HRG), Safran's Hemispherical Resonator Gyroscope (HRG), Innalab's cylindrical resonator gyroscope, Watson's cylinder resonator gyroscope, Boeing's disk resonator gyroscope, and Silicon Sensing System's vibratory ring gyroscope.

2. Calculation of Orientations of Principal Stiffness Axes and Resonance Frequencies of Wine-Glass Modes There are an infinite number of wine-glass modes with different displacement patterns. A wine-glass mode whose displacement pattern has a rotational symmetry with an order of n is called the "nth wine-glass mode". The antinodes 28 of the displacement patterns of each nth wine-glass mode are separated by $\pi/n$ radians. The antinodes 28 of two different nth wine-glass modes are separated by $\pi/2n$ radians. For example, the antinodes 28 of each n=2 wine-glass mode (in FIG. 1) are separated by $\pi/2$ radians. The antinodes 28 of two n=2 wine-glass modes 30, 32 are separated by $\pi/4$ radians. The orientation of the principal stiffness axis is defined as polar angular coordinate of the principal spring constants in a two-dimensional space. The angular coordinates of the principal stiffness axes are the same as the angular coordinates of the antinodes 28 for each of the wine-glass mode modes 30, 32.

Figure 2:
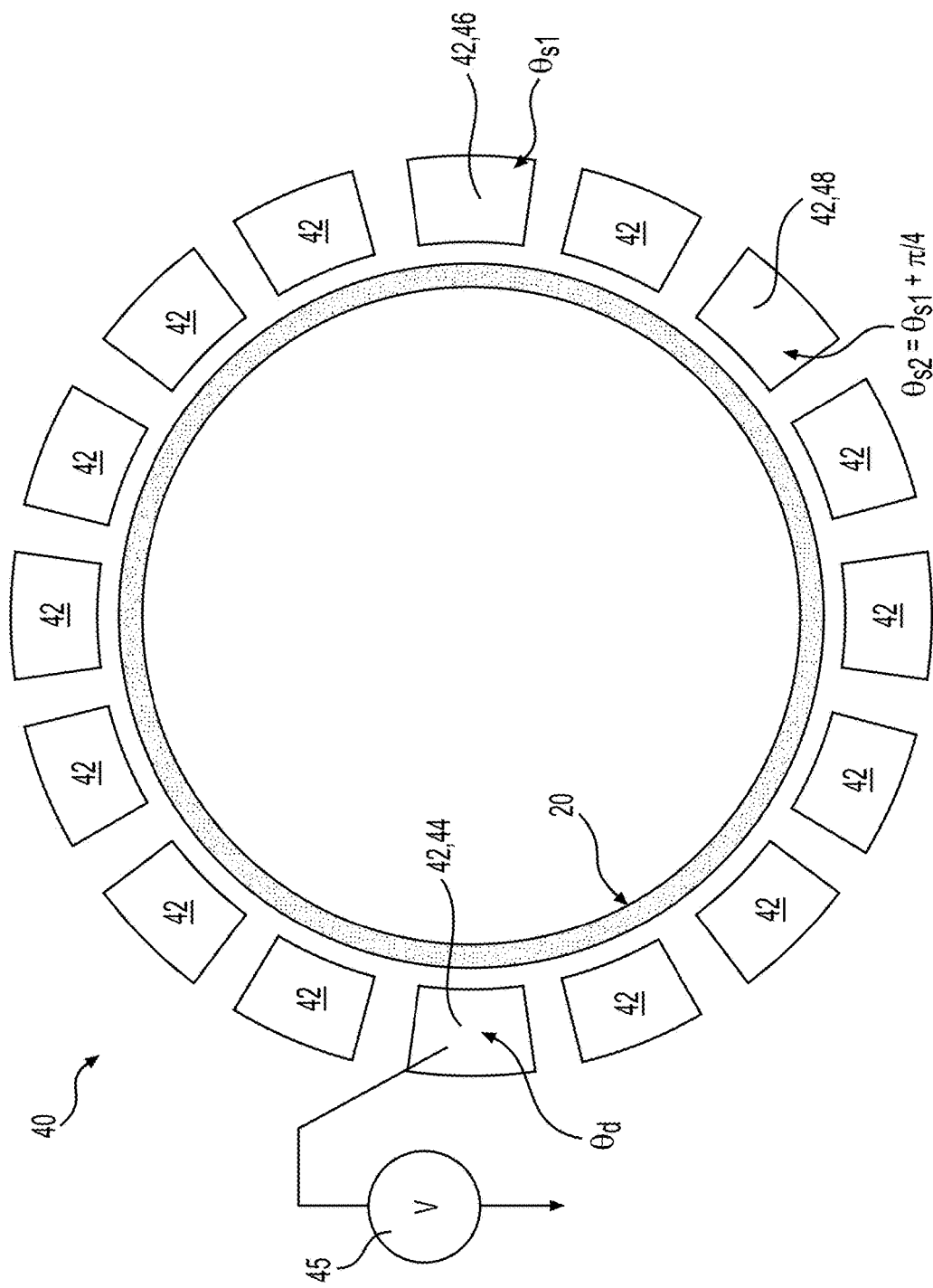
FIG. 2 shows a top view of a capacitive actuator and detector device disposed around a miniature electromechanical resonator.

FIG. 2 shows a top view of a vibration actuator/detector 40 configured to measure locations of a first principal stiffness axis $\theta_{WG1}$ and a second principal stiffness axis $\theta_{WG2}$ of the miniature electromechanical resonator 20, and wine-glass mode frequencies $f_{WG1}$, $f_{WG2}$ corresponding to each of the first and second principal stiffness axes $\theta_{WG1}$, $\theta_{WG2}$. Specifically, the vibration actuator/detector 40 illustrated in FIG. 2 takes the form of a capacitive actuator and detector device disposed around a miniature electromechanical resonator 20. However, the vibration actuator/detector 40 may include one or more different actuators for causing the miniature electromechanical resonator 20 to vibrate, such as a piezoelectric actuator. Similarly, the vibration actuator/detector 40 may include one or more different detectors for measuring vibration of the miniature electromechanical resonator 20. The detectors may include an optical detector, such as a Laser Doppler Velocimeter.

Specifically, the example vibration actuator/detector 40 shown in FIG. 2 includes sixteen electrodes 42 arranged in a circle around the miniature electromechanical resonator 20. Each of the electrodes 42 may have the same angular spans and the same angular separation. Each of the electrodes 42 is capacitively coupled with the miniature electromechanical resonator 20. The miniature electromechanical resonator 20 may include a coating of a conductive material to enable the capacitive coupling with the electrodes 42. One of the electrodes 42 is configured as an actuator electrode 44, to which a voltage is applied for causing a corresponding region of the miniature electromechanical resonator 20 to vibrate. Two other ones of the electrodes 42 are configured as detector electrodes 46, 48 for measuring vibration of corresponding regions of the miniature electromechanical resonator 20.

The angular coordinates of the principal stiffness axes $\theta_{WG1}$, $\theta_{WG2}$ are calculated using the trigonometric relationship between the radial displacement amplitude of the resonator 20 in the two wine-glass modes. The radial displacement of the resonator ($d_r$) 20 in nth wine-glass modes in radial coordinates are expressed as:

$$d_r(\theta_s)(\text{mode 1}) \propto \cos(2\pi f_{WG1} t)\cos(n(\theta_s-\theta_{WG1}))\cos(n(\theta_d-\theta_{WG1})) \quad \text{(Eq. 1)}$$

$$d_r(\theta_s)(\text{mode 2}) \propto \cos(2\pi f_{WG2} t)\cos(n(\theta_s-\theta_{WG2}))\cos(n(\theta_d-\theta_{WG2})) \quad \text{(Eq. 2)}$$

$\theta_s$ is an angular coordinate (rad) where radial displacement is measured, $d_r$ (mode 1) and $d_r$ (mode 2) are radial displacements of the resonator in nth wine-glass modes, $f_{WG1}$ and $f_{WG2}$ (Hz) are resonance frequencies of the two wine-glass modes, t (s) is time, and $\theta_{WG1}$ and $\theta_{WG2}$ (rad) are the angular coordinates of the antinodes of the two wine-glass modes, and $\theta_d$ (rad) is the angular coordinate of where actuation force (=driving force) is applied. $\theta_{WG2}$ is equal to $\theta_{WG1} + \pi/2n$ radians. The above equations are valid when varying actuation force with a frequency sufficiently close to the resonance frequency of a resonator ($f_{WG1}$, $f_{WG2}$) and a constant amplitude is applied. Also, the above equations are valid when the actuation force is applied for sufficiently longer than the decay time constant (i.e. ring-down time) of a resonator.

$\theta_{WG1}$ and $\theta_{WG2}$ may be calculated using the following method:

Step 1: The resonator 20 is actuated in nth wine-glass modes using the actuator electrode 44 located at $\theta_d$ (rad). The radial displacement of the resonator 20 in the nth wine-glass modes are measured using a first detector electrode (=sensing electrode) 46 located at $\theta_{s1}$ (rad), and a second detector electrode 48 located at $\theta_{s2}=\theta_{s1}+\pi/2n$ (rad). In the example shown in FIG. 2, n=2, and thus $\theta_{s2}=\theta_{s1}+\pi/4$ (rad). The frequencies of the two wine-glass modes are called $f_{WG1}$ and $f_{WG2}$ ($f_{WG1}<f_{WG2}$). In other words, step 1 includes measuring a radial displacement of the miniature electromechanical resonator 20 at each of a first detector location $\theta_{s1}$ and a second detector location $\theta_{s2}$ spaced apart from the first detector location $\theta_{s1}$, where the first detector location $\theta_{s1}$ is rotationally spaced apart from the actuation location $\theta_d$ by an arbitrary non-zero angle, and the two detector locations $\theta_{s1}$, $\theta_{s2}$ are each rotationally spaced apart from one another by $\pi/2n$ radians.

Step 2: From the amplitudes of the displacement values measured from the first and second detector electrodes 46, 48 in the two wine-glass modes (i.e. with the resonator 20 actuated to vibrate at each of the two resonance frequencies $f_{WG1}$, $f_{WG2}$), and from Eq. 1 and 2 above, the following parameters are derived:

$$R_{12\_mode1} \equiv \frac{d_r(\theta_{s1})}{d_r(\theta_{s2})} \quad \text{(mode 1)}$$
$$= \frac{\cos(n(\theta_{s1}-\theta_{WG1}))}{\cos(n(\theta_{s2}-\theta_{WG1}))}$$
$$= \frac{-\cos(n(\theta_{s1}-\theta_{WG1}))}{\sin(n(\theta_{s1}-\theta_{WG1}))}.$$

$$R_{12\_mode2} \equiv \frac{d_r(\theta_{s1})}{d_r(\theta_{s2})} \quad \text{(mode 2)}$$
$$= \frac{-\cos(n(\theta_{s1}-\theta_{WG2}))}{\cos(n(\theta_{s2}-\theta_{WG2}))}$$
$$= \frac{-\cos(n(\theta_{s1}-\theta_{WG2}))}{\sin(n(\theta_{s1}-\theta_{WG2}))}$$

In other words, step 2 includes calculating a first ratio $R_{12\_Model}$ of the radial displacement of the resonator 20 at the first detector location $\theta_{s1}$ to the radial displacement of the resonator 20 at the second detector location $\theta_{s2}$ with the actuation location $\theta_d$ of the resonator 20 being vibrated at the first wine-glass mode frequency $f_{WG1}$. Step 2 also includes calculating a second ratio $R_{12\_Mode2}$ of the radial displacement of the resonator 20 at the first detector location $\theta_{s1}$ to the radial displacement of the resonator 20 at the second detector location $\theta_{s2}$ with the actuation location $\theta_d$ of the resonator 20 being vibrated at the second wine-glass mode frequency $f_{WG2}$.

Step 3: Assuming that Q of the two nth wine-glass modes are similar (this is true for a miniature resonator with fairly high structural symmetry), the angular coordinates of the principal stiffness axes ($\theta_{WG1}$ and $\theta_{WG2}$) are calculated as:

$$\theta_{WG1} = \theta_{s1} + \frac{1}{n}\arctan(R_{12\_model}).$$
$$\left(-\frac{\pi}{2n}(\text{rad}) \leq \theta_{WG1} \leq 0 \,(\text{rad})\right).$$
$$\theta_{WG2} = \theta_{s1} + \frac{1}{n}\arctan(R_{12\_mode2})$$
$$\left(0(\text{rad}) \leq \theta_{WG1} \leq \frac{\pi}{2n}\,(\text{rad})\right).$$

In other words, step 3 includes calculating an angular coordinate of the first principal stiffness axis ($\theta_{WG1}$) using the ratio of the radial displacement at the first detector location $\theta_{s1}$ to the radial displacement at the second detector location $\theta_{s2}$ with the actuation location $\theta_d$ being vibrated at the first wine-glass mode frequency $f_{WG1}$ (i.e. using the first ratio $R_{12\_Model}$). Step 3 also includes calculating an angular coordinate of the second principal stiffness axis ($\theta_{WG2}$) using the ratio of the radial displacement at the first detector location $\theta_{s1}$ to the radial displacement at the second detector location $\theta_{s2}$ with the actuation location $\theta_d$ being vibrated at the second wine-glass mode frequency $f_{WG2}$ (i.e. using the second ratio $R_{12\_Mode2}$).

3. Micro-Machining Process

Various different methods of the present disclosure include removal or addition of a precise amount of material at accurate locations on the surface of a resonator 20 using ultrasonic energy. FIG. 3A shows a profile view of a micro-machining apparatus 60 in operation machining a rim 26 of a miniature electromechanical resonator 20 in the form of a 3D shell resonator. The micro-machining apparatus 60 may also be called a machining tool 60. FIG. 3B illustrates removal of material from the rim 26 of the miniature electromechanical resonator 20 by the micro-machining apparatus 60 to form a pit 76. Specifically, the example micro-machining apparatus 60 shown in FIG. 3A, includes an ultrasonic transducer 62, an ultrasonic horn 64, and a micro-machining tip 70, which may also be called a machining tip 70. The ultrasonic transducer 62 may have a vibrating frequency of 10-100 kHz. The transducer 62 may include of a piezoelectric actuator or a magneto-restrictive actuator.

The vibration frequency of an ultrasonic transducer should be separated from the resonance frequency of a machining piece by more than a few thousand Hz in order to prevent the machining piece from resonating while it is being micro-machined. A typical power of an ultrasonic transducer for this process is 1-500 Watts.

The ultrasonic horn 64 is firmly attached to the ultrasonic transducer 62 using a screw (not shown). The ultrasonic horn 64 may have a length of a half of its mechanical wavelength. The horn 64 has a resonance frequency that matches with the vibration frequency of the ultrasonic transducer 62, which maximizes the vibration amplitude at the tip. The horn 64 may have a radius that reduces from a proximal end 66, where it is firmly attached to the ultrasonic transducer 62 to a distal end 68 where the horn 64 is firmly attached to the micro-machining tip 70. Examples of such an ultrasonic horn 64 include catenoidal and exponential ultrasonic horns.

The micro-machining tip 70 is firmly attached to the ultrasonic horn 64 at or near the distal end 68 using a screw 72. To remove material (as illustrated in FIG. 3B) from a workpiece made of a brittle material, the micro-machining tip 70 is preferably made of a brittle material having a Young's modulus that is substantially equal to or lower than the Young's modulus of the workpiece to be machined. For example, to remove material from glass or fused silica, a preferred material for a micro-machining tip 70 is silicon, alumina, and re-enforced epoxy resin. A micro-machining tip 70 made of this kind of material gently wears out together with the workpiece and creates a fine powder debris, which effectively acts as grinding slurry. The debris also acts as a shock absorption material to prevent propagation of cracks. The vibrating amplitude of the micro-machining tip 70 is typically a few nanometers to a few tens of micrometers.

In some embodiments, and as shown in FIG. 3C, the micro-machining apparatus 60 may be configured to add material 74 to the rim 26 of the miniature electromechanical resonator 20. The added material 74 may be fused onto a surface of the miniature electromechanical resonator 20 using ultrasonic energy. Examples of materials 74 that can be added to a surface of a workpiece using ultrasonic energy include gold, silver, platinum, and aluminum.

In some embodiments of the present disclosure, the miniature electromechanical resonator 20 may be machined in a vacuum or in a partial vacuum or at an ambient pressure. It may be advantageous to machine the resonator 20 in a dry environment, such as a vacuum or a partial vacuum, because its resonance frequencies $f_{WG1}$, $f_{WG2}$ and Q can be frequently measured in such an environment. In some embodiments, and particularly if it is necessary to fabricate very fine features on the surface of a workpiece such as the resonator 20, this machining can be done in liquid.

To change the resonance frequency of a 3D miniature resonator 20 vibrating in the wine-glass mode, micro-machining is done on the rim surface 26 or the surfaces near the rim 26. This is because these locations have the largest mechanical energy concentration during vibration, so changing the local stiffness and the mass in these regions causes the largest amount of change to the resonance frequency and Q.

Figure 4A:
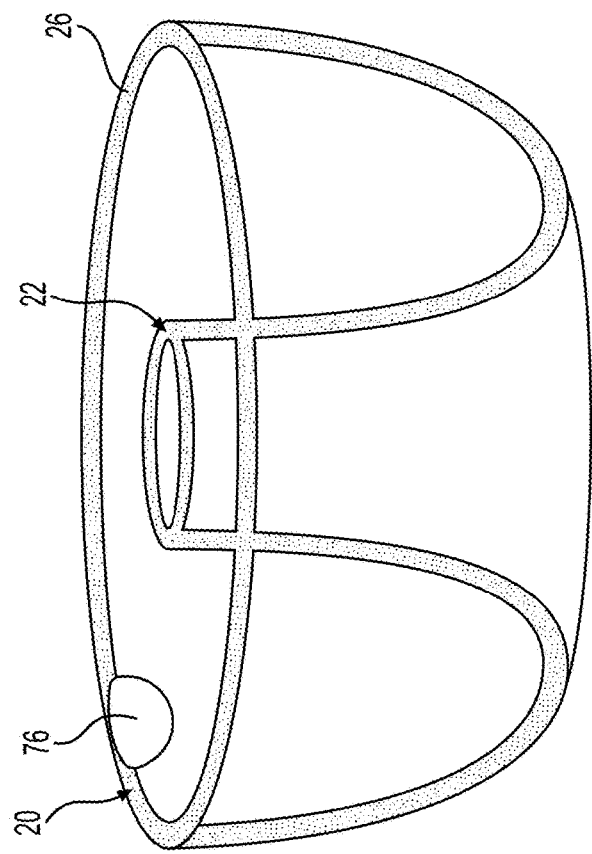
FIG. 4A shows a profile view of a miniature electromechanical resonator with a hemispherical pit in a rim thereof.
Figure 4C:
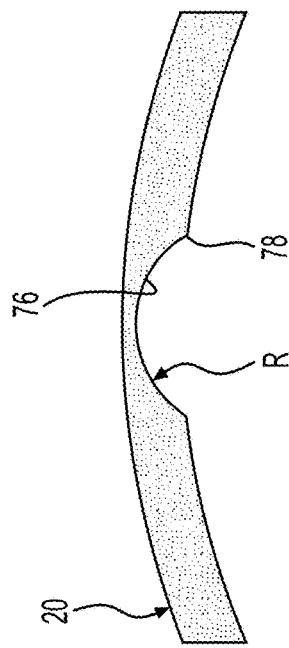
FIG. 4C shows an enlarged section of the miniature electromechanical resonator with a hemispherical pit in a rim thereof.
Figure 4B:
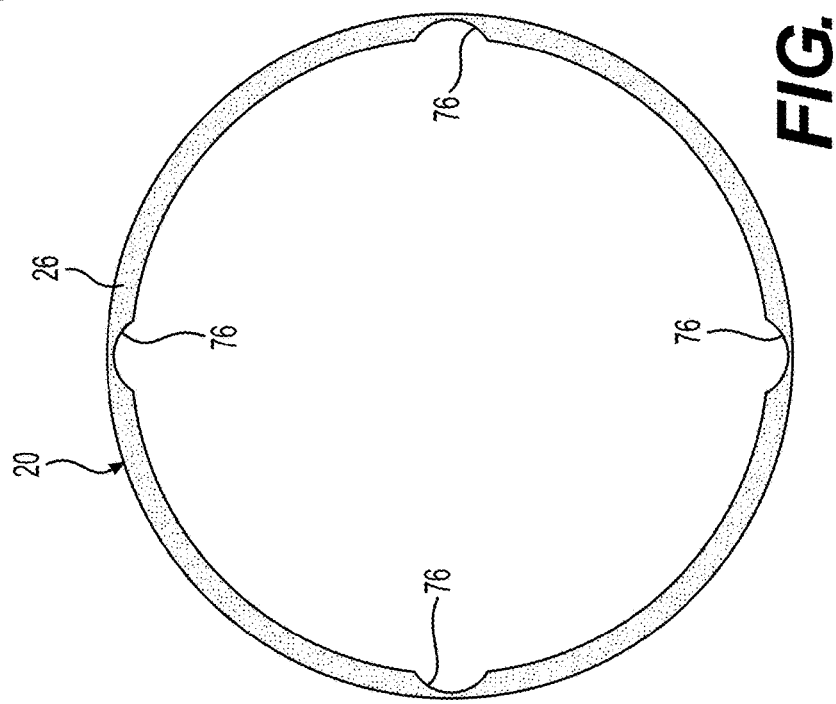
FIG. 4B shows a top view of the miniature electromechanical resonator with a hemispherical pit in a rim thereof.

FIGS. 4A-4C show a profile view and a topside view of a 3D miniature resonator 20 micro-machined according to a process of the present disclosure. A part of the rim surface 26 and a part of an inner surface near the rim 26 are engraved in the pattern of a hemispherical pit 76. The radius (R) of the pit 76 is generally smaller than 20% of the radius of the resonator 20. As shown in FIG. 4C, a corner 78 of the pit 76 is rounded in order to reduce the concentration of mechanical stress during vibration, which can lower Q. The rounded corners, thus, increase Q of the resonator 20.

4. Automated Batch Micro-Machining Apparatus

Figure 5:
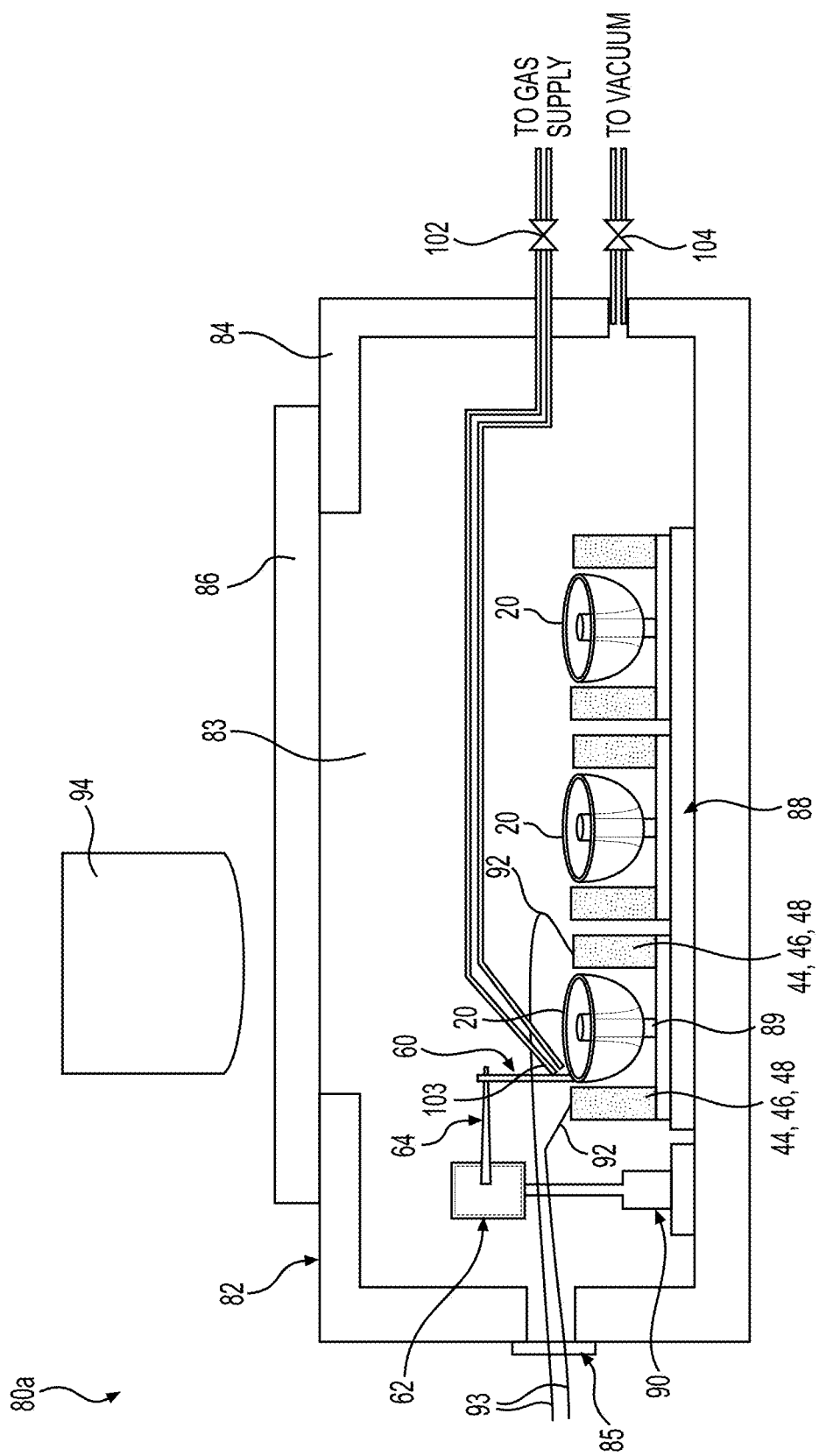
FIG. 5 shows a first batch-mode micro-machining apparatus according to aspects of the disclosure.

FIGS. 5-10 show automatic batch-mode micro-machining apparatuses 80*a*, 80*b*, 80*c*, 80*d*, 80*e*, 80*f* according to various aspects of the disclosure. FIG. 5 shows a first batch-mode micro-machining apparatus 80*a* comprising an enclosure 82 defining a chamber 83 that is hermetically sealed (i.e., a vacuum chamber). The enclosure 82 includes a housing 84, of rigid material, such as metal, with a transparent widow 86 on a top surface of the housing 84. An ultrasonic micro-machining apparatus 60 is mounted on a machining positioner 90 such as an X-Y-Z stage, for positioning the machining tool 60 in 3 orthogonal axes (X, Y, and Z). In some embodiments, the machining positioner 90 provides for additional degrees of freedom, such as tilting about one or more axes. The ultrasonic micro-machining apparatus 60 and the machining positioner 90 are both located within the chamber 83.

A workpiece conveyor 88, such as an X-Y stage is placed underneath two or more miniature resonators 20 within the chamber 83 and is configured to move a selected one of the resonators 20 into a position for machining. Miniature resonators 20 are suspended by their anchor 22 upon a support post 89 at the center. The resonators 20 are placed near capacitive electrodes 44, 46, 48 for actuating and detecting vibration. Electrical probes 92 are configured to contact the capacitive electrodes 44, 46, 48 for providing electrical connections to external circuitry (not shown) outside of the enclosure 82. Wires 93 extend through a pass-through seal 85 in the housing 84 to provide electrical connection between the electrical probes 92 and external circuitry. The first batch-mode micro-machining apparatus 80*a* also includes an optical microscope 94 for inspecting the machining process. The first batch-mode micro-machining apparatus 80*a* also includes a positive pressure valve 102 for controlling flow of a pressurized gas, such as compressed air, into the enclosure 82 and through a nozzle 103 that is directed toward a region where one of the resonators 20 is machined. The first batch-mode micro-machining apparatus 80*a* also includes a vacuum valve 104 controlling fluid communication between a vacuum source (not shown), such as a vacuum pump, and the chamber 83 of the enclosure 82. The vacuum valve 104 may, thus provide for a vacuum condition within the chamber 83 having substantially all of the air removed therefrom. Alternatively, the vacuum valve 104 may provide a partial vacuum condition within the chamber 83 with some air remaining, but with an air pressure lower than ambient conditions.

The micro-machining process is conducted in the following steps: 1) The electrical probes 92 are placed on the capacitive electrodes 44, 46, 48 to actuate and measure the vibrating motion of a resonator 20 in the wine-glass modes. 2) The angular coordinates of the principal stiffness axes and resonance frequencies for individual principal stiffness axes are calculated using the mathematical equations described above. 3) A precise amount of material is removed from or added to a precise location on the rim 26 and/or surfaces near the rim 26. 4) The vacuum valve 104 is closed, and the positive pressure valve 102 is opened to vent the chamber 83 and blow away the debris created during micro-machining process. 5) The positive pressure valve 102 is closed, and the vacuum valve 104 is opened to pump down the chamber 83. 6) Steps 1 through 5 are repeated until resonance frequencies reach desired values.

Figure 6:
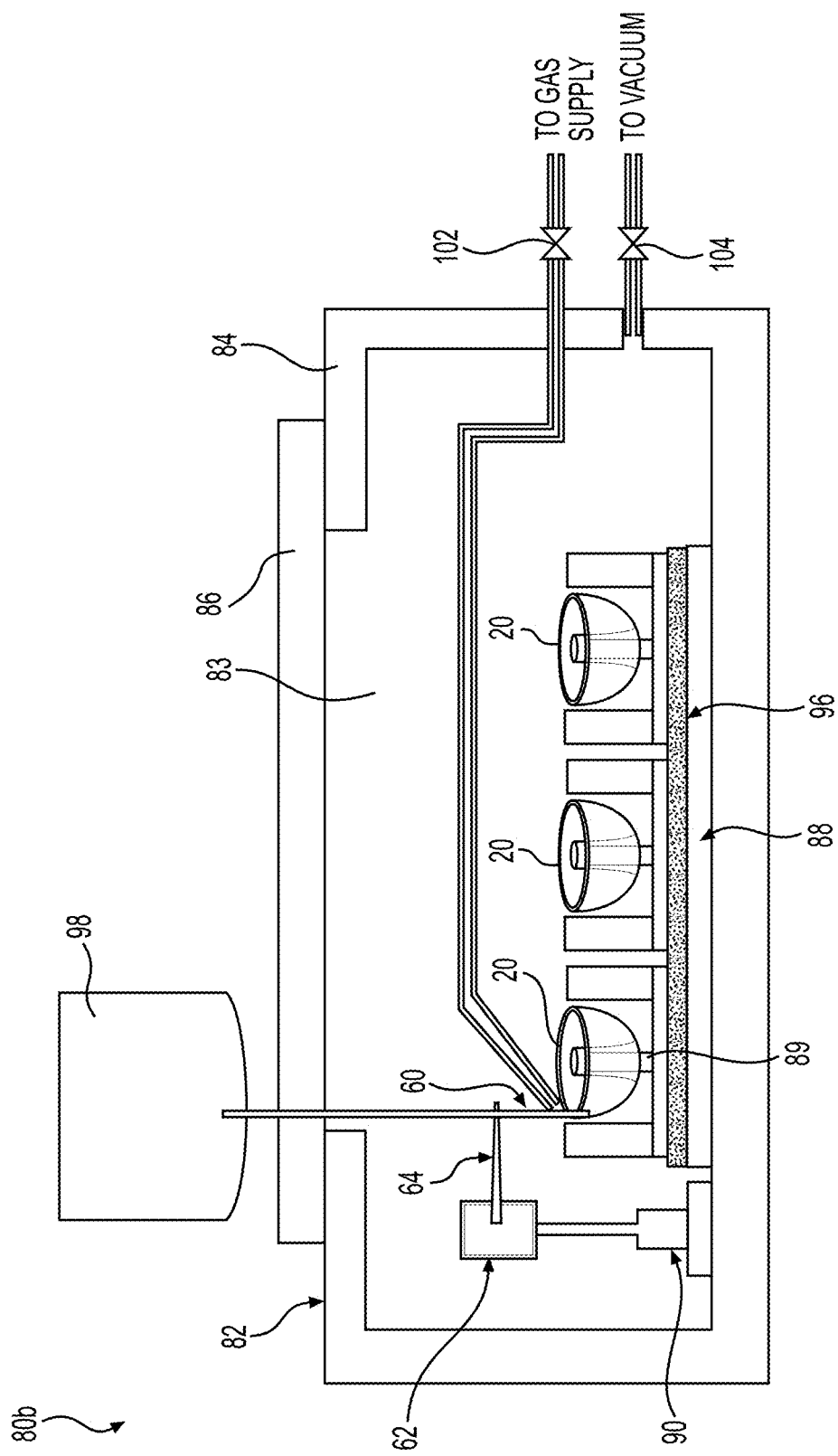
FIG. 6 shows a second batch-mode micro-machining apparatus according to aspects of the disclosure.

FIG. 6 shows a second batch-mode micro-machining apparatus 80b that uses a piezoelectric actuator 96 and an optical detector 98 to actuate and measure the vibration of a resonator 20. A piezoelectric actuator 96 is placed below miniature electromechanical resonators 20. The piezoelectric actuator 96 is driven at the wine-glass mode frequency of a resonator 20 to drive the resonator in the wine-glass mode. An optical detector 98, such as a Laser Doppler meter or a split photodetector, is connected to the end of a microscope and measures the vertical displacement amplitude of the resonator 20 in the wine-glass modes at all angles. The angular coordinates of the principal stiffness axes and the resonance frequencies of individual principal stiffness axes are determined using the mathematical calculation method discussed in Section 2.

Figure 7:
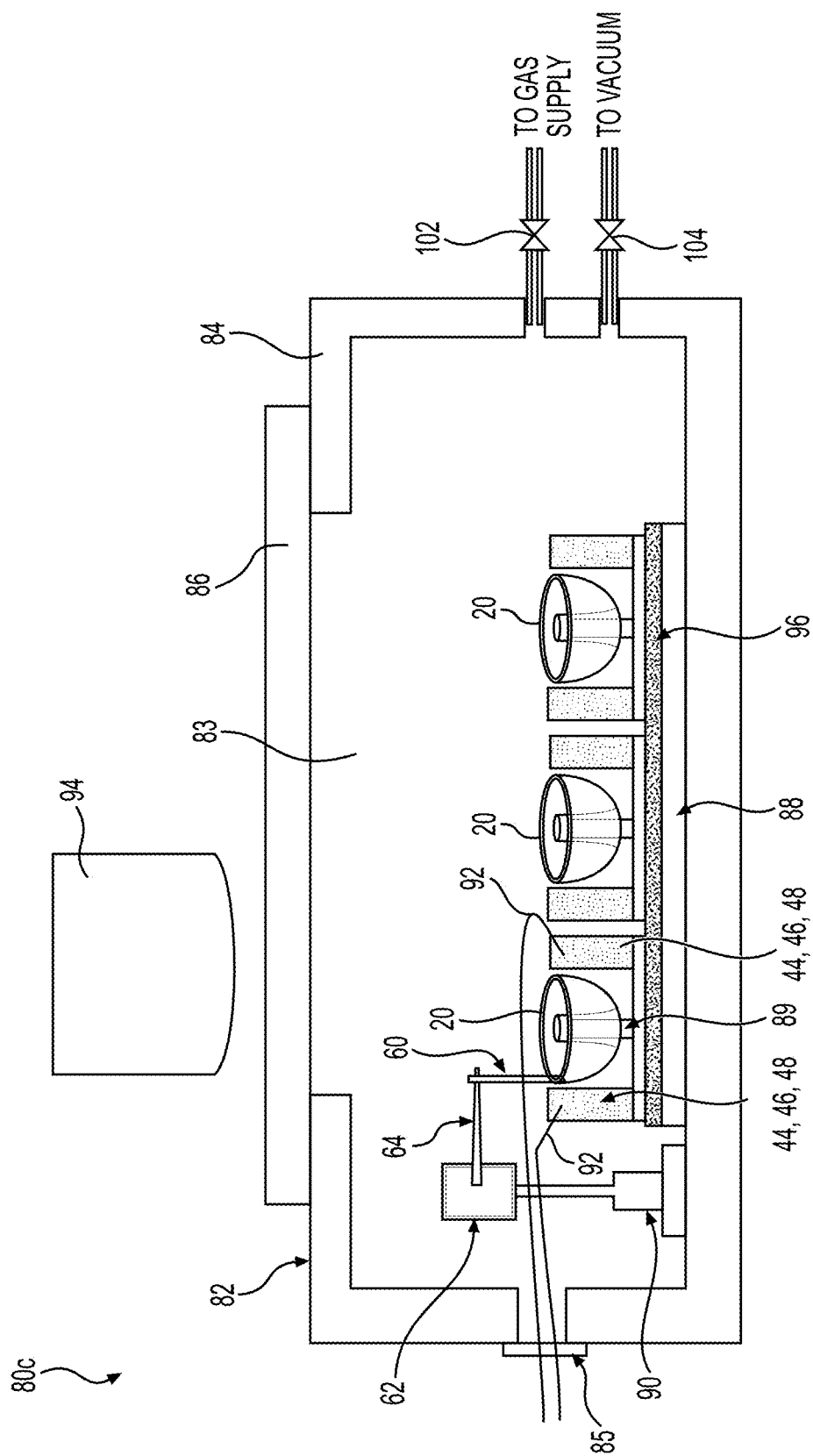
FIG. 7 shows a third batch-mode micro-machining apparatus according to aspects of the disclosure.

FIG. 7 shows a third batch-mode micro-machining apparatus 80c that uses a piezoelectric actuator 96 to actuate a resonator 20 and uses electrical probes to measure the motion of the resonator 20. This apparatus is similar to that in FIG. 5, except that a piezoelectric actuator 96 is used to actuate the resonator 20. The piezoelectric actuator 96 can also be used to shake away the debris created during micro-machining process step.

Figure 8:
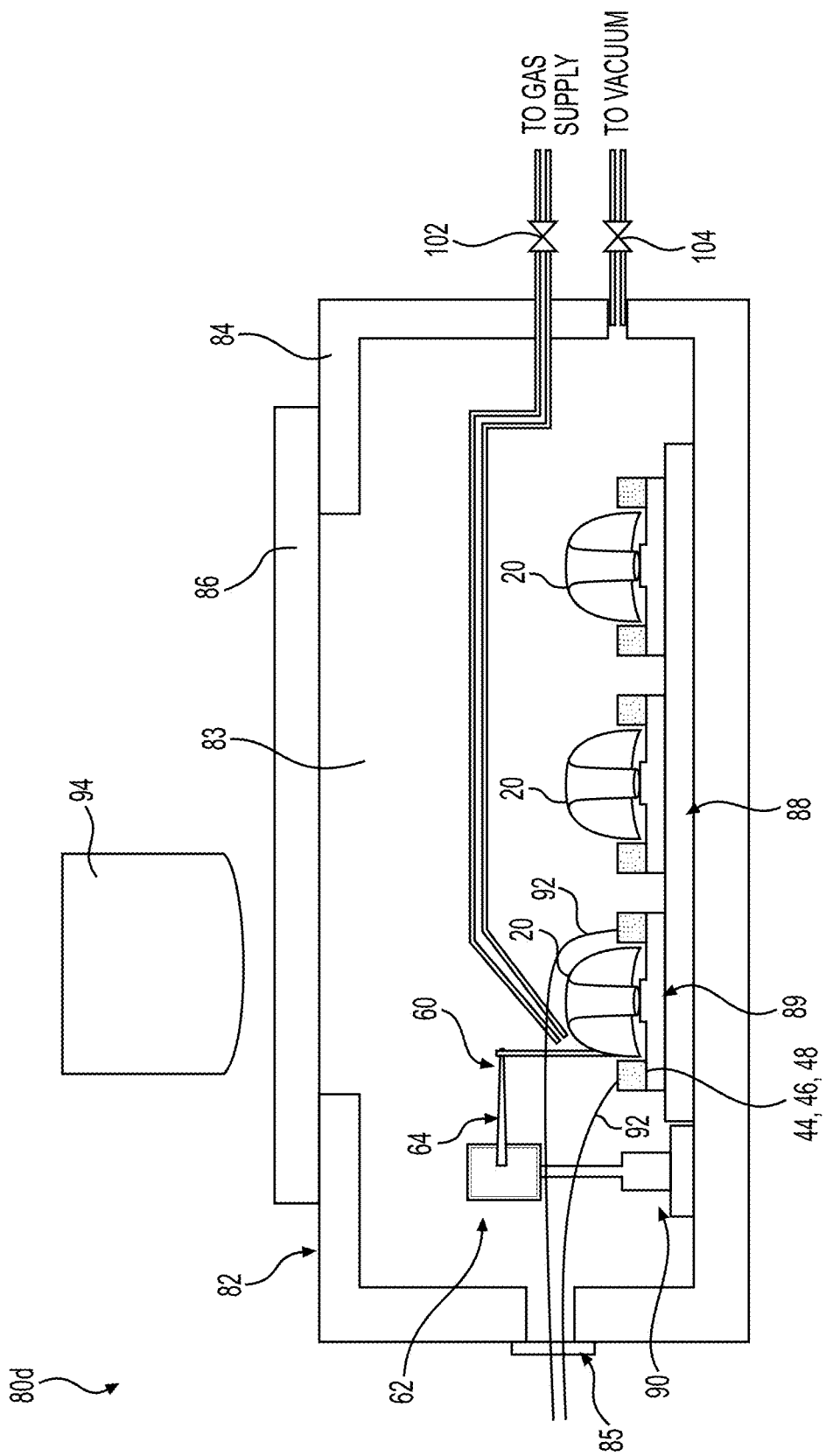
FIG. 8 shows a fourth batch-mode micro-machining apparatus according to aspects of the disclosure.
Figure 9:
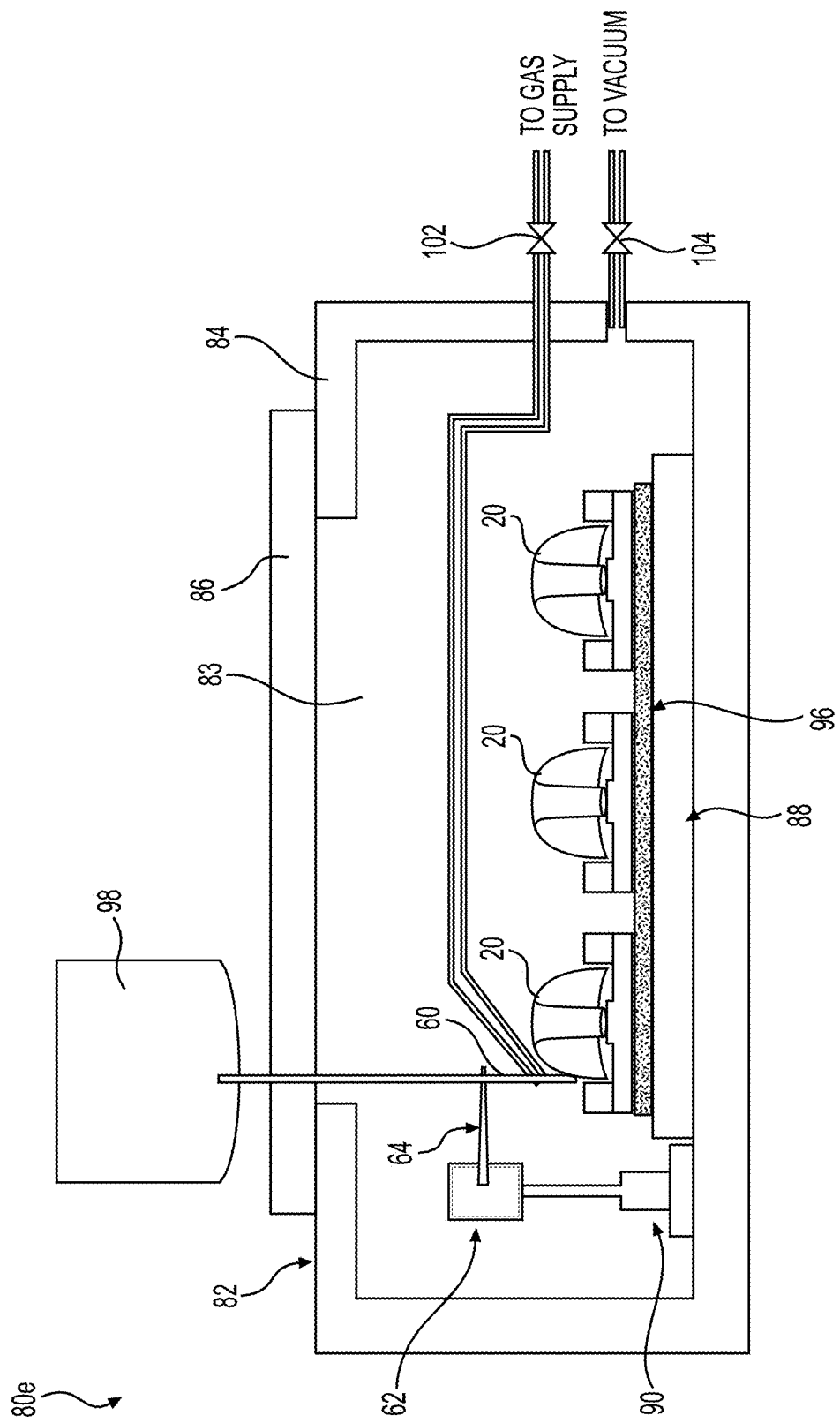
FIG. 9 shows a fifth batch-mode micro-machining apparatus according to aspects of the disclosure.
Figure 10:
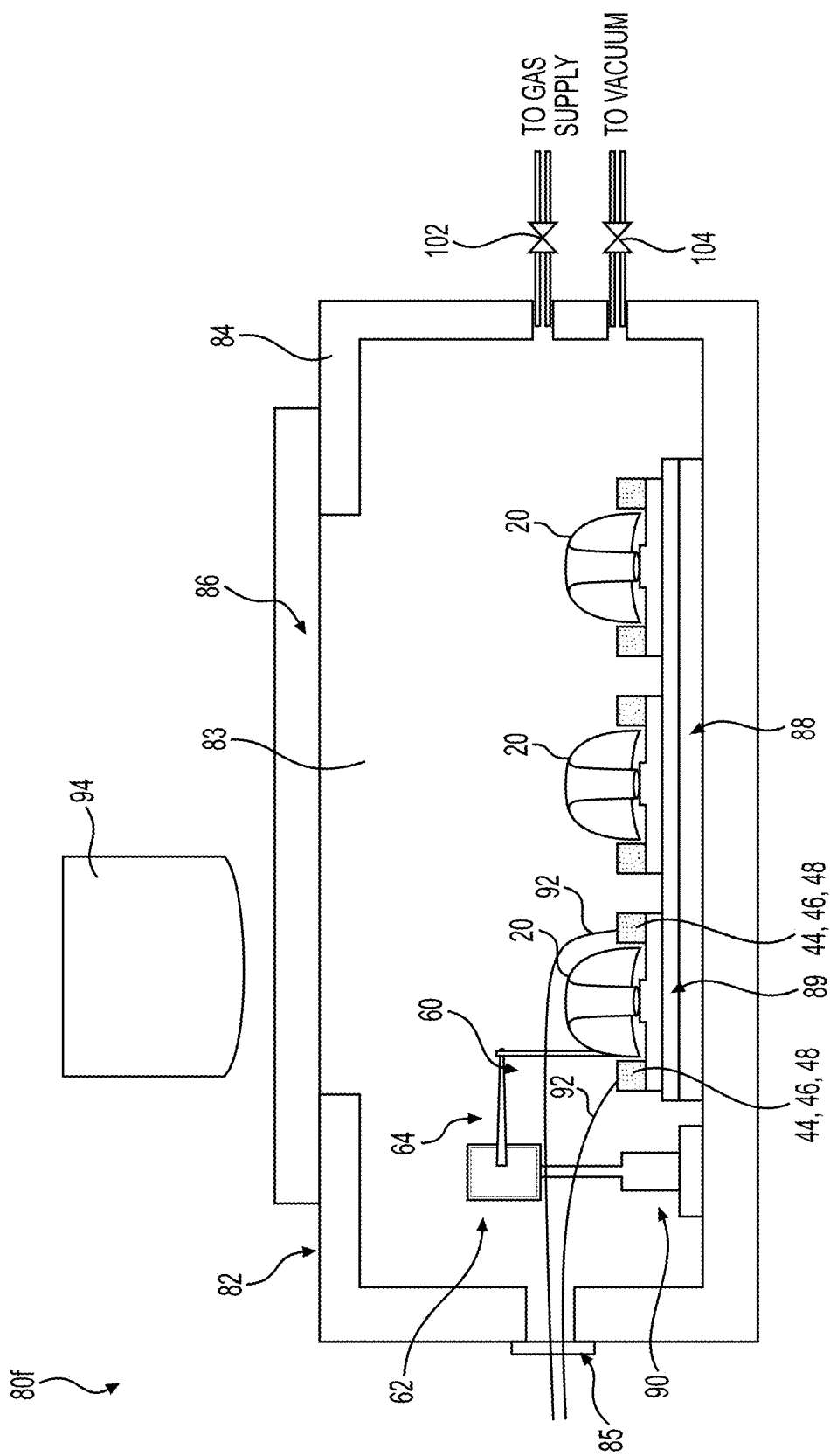
FIG. 10 shows a sixth batch-mode micro-machining apparatus according to aspects of the disclosure.

FIG. 8 shows a fourth batch-mode micro-machining apparatus 80d, which is similar to the first batch-mode micro-machining apparatus 80a shown in FIG. 5, except that a resonator 20 is mounted upside down. Micro-machining is done on the outer sidewall of the resonator 20. FIG. 9 shows a fifth batch-mode micro-machining apparatus 80e, which is similar to the second batch-mode micro-machining apparatus 80b of FIG. 6, except that the resonator 20 is mounted face down. FIG. 10 shows a sixth batch-mode micro-machining apparatus 80f, which is similar to third batch-mode micro-machining apparatus 80c of FIG. 7, except that the resonator 20 is mounted faced down.

5. Principle of Frequency Change Due to Micro-Machining Process

The micro-machining process of the present disclosure is used to change the resonance frequency of a miniature resonator 20 by changing the stiffness (i.e. the spring constant) and mass of localized regions of a resonator 20. A change of local stiffness causes a change in the local elastic energy concentration. A change of local mass results in a change in the local elastic energy concentration. The local elastic energy concentration at a coordinate of (x, y, z) is:

Elastic Energy Concentration$(x,y,z) \propto k(x,y,z) \times \varepsilon(x,y,z)^2$.

where k (x,y,z) [N/m] is a local spring constant, and $\varepsilon$(x, y, z) is local strain.

The total amount of elastic energy stored in a device is calculated by integrating the local elastic energy concentrations for entire volume of the resonator.

Total Elastic Energy=$\int_{Volume}$ Elastic Energy Concentration$(x,y,z)dV$

The kinetic energy concentration of a small region located at a coordinate of (x, y, z) is expressed as:

Kinetic Energy Concentration$(x,y,z) \propto m(x,y,z) \times d(x,y,z)^2$ where m (x,y,z) [kg] is local mass, and d (x,y,z) [m] is a local displacement amplitude.

The total amount of kinetic energy stored in a device is calculated by integrating the local elastic energy concentrations for entire volume of the resonator.

Total Kinetic Energy=$\int_{Volume}$ Kinetic Energy Concentration$(x,y,z)dV$

An effective spring constant ($k_{effective}$) [N/m] is defined as the total elastic energy stored in a device divided by the square of the maximum value of the local strain. An effective mass ($M_{effective}$) is defined as the total kinetic energy stored in a device divided by the square of the maximum value of the local displacement. The resonance frequency of a mechanical resonance mode is calculated as:

$$f = \frac{1}{2\pi}\sqrt{\frac{k_{effective}}{M_{effective}}}$$

The new resonance frequency ($f_{new}$) after micro-machining is expressed in terms of the original effective spring constant, original effective mass, and the changes in the effective spring constant ($\Delta k_{effective}$) [N/m] and the effective mass ($\Delta M_{effective}$) due to the micro-machining process as:

$$f_{new} = \frac{1}{2\pi}\sqrt{\frac{k_{effective} + \Delta k_{effective}}{M_{effective} + \Delta M_{effective}}}$$

If material is removed from a device by the micro-machining process (similar to FIG. 4), both $\Delta k_{effective}$ and $\Delta M_{effective}$ become negative numbers. If a material is added to a device by the micro-machining process, $\Delta k_{effective}$ and $\Delta M_{effective}$ become positive numbers. As shown below, $\Delta k_{effective}$ and $\Delta M_{effective}$ are strong functions of the angular coordinates of the principal stiffness axes of the wine-glass modes and the angular coordinates of where material is removed from or added to a device.

Figures 11A, 11B:
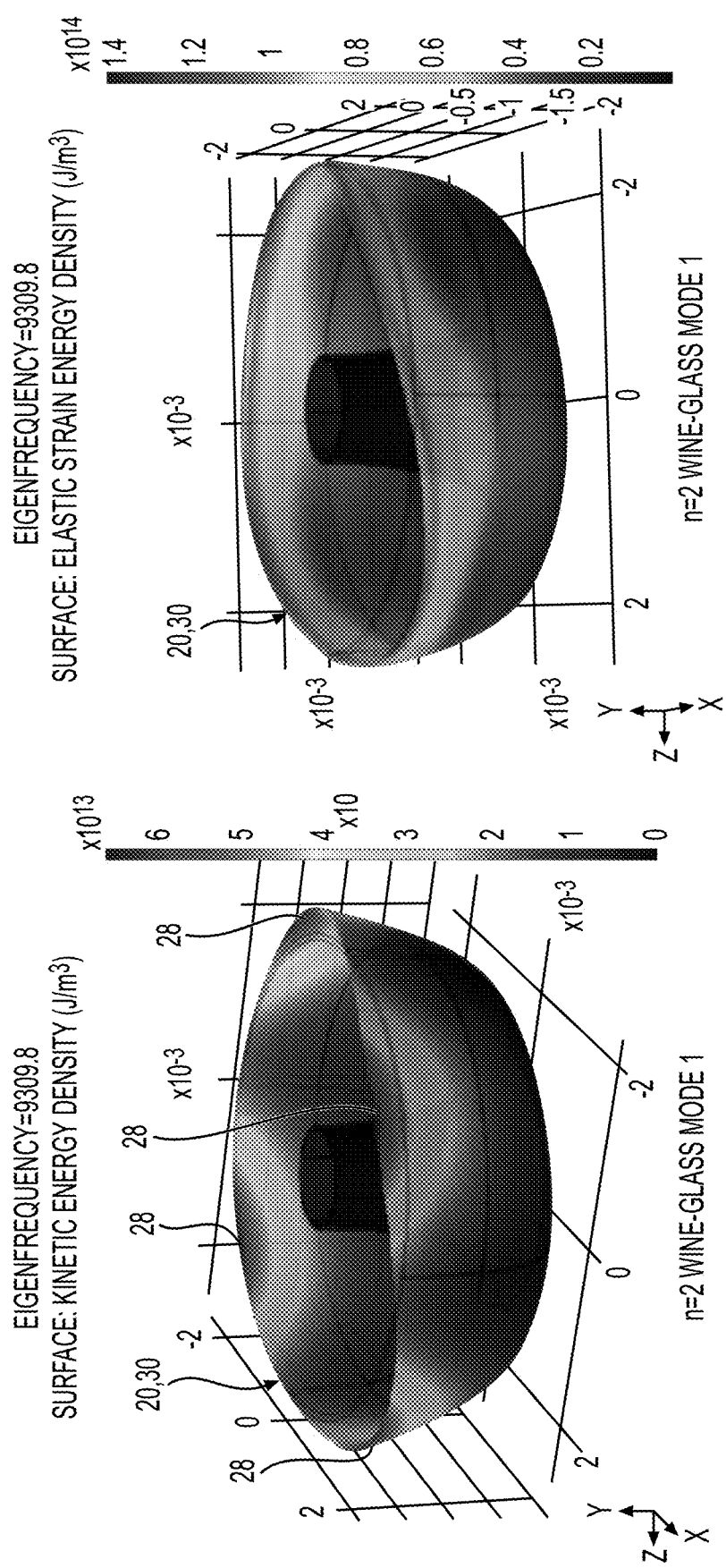
FIG. 11A shows a kinetic energy concentration profile of a miniature electromechanical resonator vibrating in mode 1 of n=2 wine-glass modes.
FIG. 11B shows an elastic energy concentration profile of the electromechanical resonator vibrating in mode 1 of n=2 wine-glass modes of FIG. 11A.
Figures 11C, 11D:
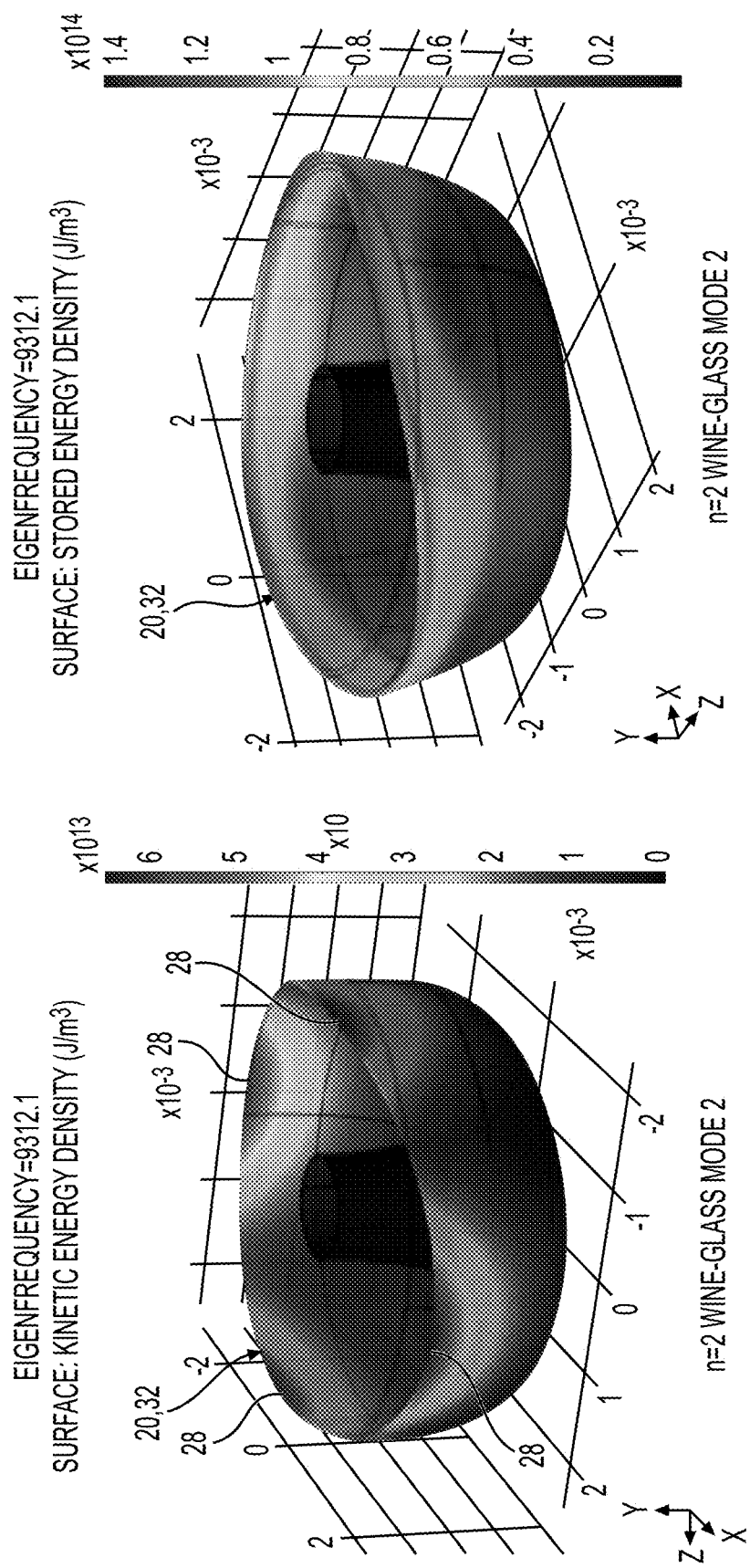
FIG. 11C shows a kinetic energy concentration profile of a miniature electromechanical resonator vibrating in mode 2 of n=2 wine-glass modes.
FIG. 11D shows an elastic energy concentration profile of the electromechanical resonator vibrating in mode 2 of n=2 wine-glass modes of FIG. 11C.

FIGS. 11A through 11D show the kinetic and elastic energy concentrations profiles of a 3D miniature resonator 20 vibrating in the n=2 wine-glass modes. FIG. 11A shows a kinetic energy concentration profile of a miniature electromechanical resonator 20 vibrating in mode 1 of n=2 wine-glass modes with coloration on a scale of 0.0–v6.5×10^13 J/m³. FIG. 11B shows an elastic energy concentration profile of the electromechanical resonator 20 vibrating in mode 1 of n=2 wine-glass modes of FIG. 11A with coloration on a scale of 0.0–1.4×10^14 J/m³. FIG. 11C shows a kinetic energy concentration profile of a miniature electromechanical resonator 20 vibrating in mode 2 of n=2 wine-glass modes with coloration on a scale of 0.0–v6.5×10^13 J/m³. FIG. 11D shows an elastic energy concentration profile of the electromechanical resonator 20 vibrating in mode 2 of n=2 wine-glass modes of FIG. 11C with coloration on a scale of 0.0-1.4×10^14 J/m³.

FIGS. 11A and 11C are the local kinetic energy concentrations profiles in the two n=2 wine-glass modes. The kinetic energy concentration profiles have exactly the same profile with the displacement patterns of the wine-glass modes. The kinetic energy concentration is the largest at the rim surface at angular coordinates of antinodes and the lowest at the angular coordinates of nodes.

Since the displacement amplitude has the maximum value at the antinode 28, removal or addition of material on the surface of the rim 26 and/or near the surface of the rim 26 at the angular coordinates of antinodes 28 causes a large amount of change to the local kinetic energy concentration. Consequently, a large amount of change is made to the total amount of kinetic energy stored in a resonator, and |$\Delta m_{effective}$| becomes large. However, removal or addition of material on the surface of the rim 26 or near the surface of the rim 26 at the angular coordinates of nodes causes small amount of change to the local kinetic energy concentration because the displacement amplitude in that region is small. As a result, a small amount of change is made to the total amount of kinetic energy stored in a resonator, and $|\Delta m_{effective}|$ becomes small.

FIGS. 11B and 11D show elastic energy concentration profiles of a 3D miniature resonator vibrating in the n=2 wine-glass modes. The profiles show that the local elastic energy concentration is almost uniform at all angular coordinates regardless of locations of antinodes and nodes. This means that the strain in the rim at all angular coordinates are the almost the same. Therefore, removal or addition of material on the rim surface or surfaces near the rim at any angular coordinate makes nearly the same amount of change to the local elastic energy concentration. As a result, nearly the same amount of change is made to the total amount of elastic energy stored in a resonator, and $|\Delta k_{effective}|$ becomes almost the same.

Since $f_{new}$ is $1/2\pi \times \sqrt{(k_{effective} + \Delta k_{effective})/(M_{effective} + \Delta M_{effective})}$, and since $\Delta m_{effective}$ is a strong function of the angular coordinate of where material is removed from or added to a resonator whereas $\Delta k_{effective}$ is not, one can control individual nth wine-glass mode frequencies by different amounts by selecting right angular coordinates of removal or addition of material to a resonator to control the difference between the two nth wine-glass mode frequencies.

Figure 12B:
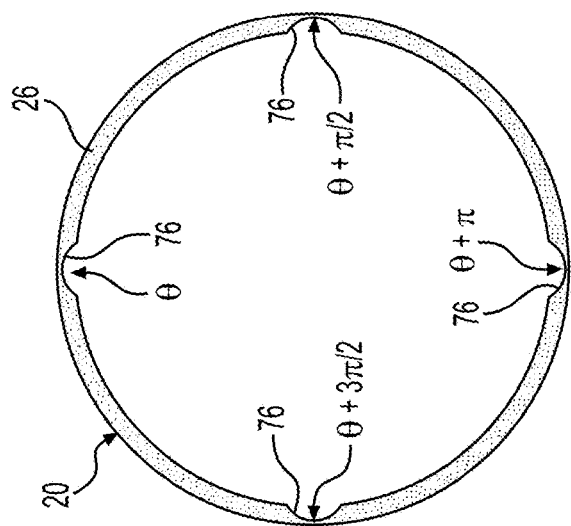
FIG. 12B shows a top view of a miniature electromechanical resonator including first angular locations where material is removed to reduce $f_2-f_1$.

6. Angular Coordinates for Material Removal or Addition for Controlling Wine-Glass Mode Frequency To create large $|\Delta m_{effective}|$, material needs to be removed or added on the rim surface or near the rim surface of a resonator at the angular coordinates of antinodes 28 of the wine-glass modes. FIGS. 12A and 12B illustrate two ways to accomplish this. FIG. 12A shows the topside view of a resonator 20 vibrating in the n=2 wine-glass modes 30, 32. The angular coordinates of antinodes are Θ and Θ+π/4 radians. The frequency of the antinode located at Θ is $f_1$, and the frequency of the antinode located at Θ+π/4 is $f_2$ (The resonance frequencies of each principal stiffness axis is determined using the method discussed in Section 2)

6.1 Angular Coordinate for Removal of Material with Micro-Machining Process

Figure 12C:
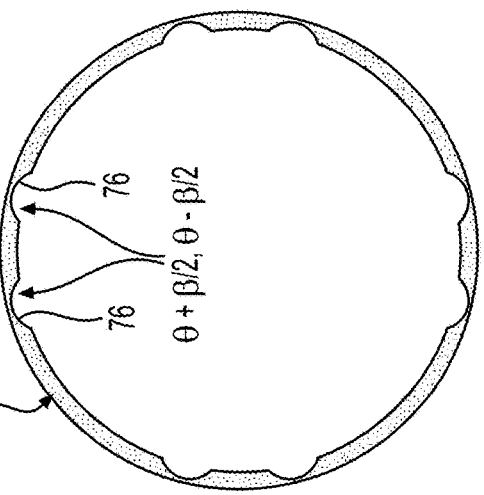
FIG. 12C shows a top view of a miniature electromechanical resonator including second angular locations around the first angular locations and where material is removed to reduce $f_2-f_1$.
Figure 12A:
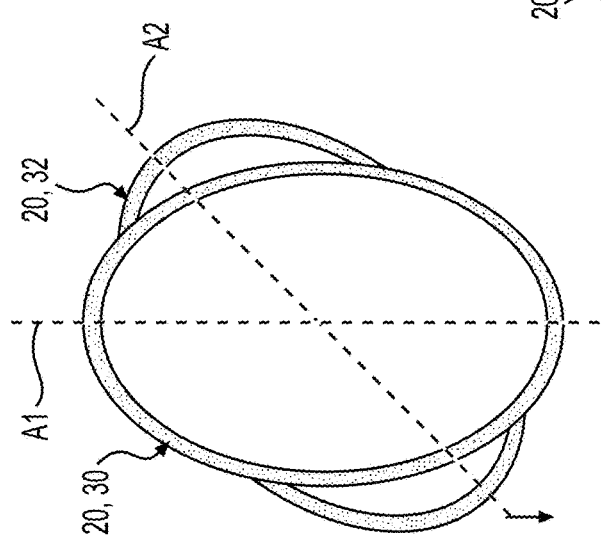
FIG. 12A shows a schematic top view of a principal stiffness axes of a miniature electromechanical resonator having n=2 wine-glass modes.

In the example embodiment illustrated on FIGS. 12A-12C, in which n=2, a difference between the first and second wine-glass mode frequencies of the miniature electromechanical resonator 20 (e.g. $f_2-f_1$ when $f_1$ is lower than $f_2$) can be reduced by removing material located on the surface of the rim 26 and sidewall surfaces near the rim 26 at angular coordinates of Θ, Θ+π/2, Θ+π, and Θ+3π/2 radians (FIG. 12B). It is not necessary to remove material from all four locations to reduce $f_2-f_1$. But it is generally desired to remove material from a pair of locations to keep the location of the center of mass at the center of the resonator 20 after micro-machining.

FIG. 12C shows the second method to reduce $f_2-f_1$. Material located on and/or near the surface of the rim 26 is removed at angular coordinates of Θ−β/2, Θ+β/2, Θ−β/2+π/2, Θ+β/2+π/2, Θ−β/2+π, Θ+β/2+π, Θ+β/2−3π/2, and Θ+β/2+3π/2 radians, where β is typically an arbitrary separation angle between 0 and π/8 radians. Removing material from a pair of angular coordinates separated symmetrically from an antinode 28 causes the same effect as removing material from the antinode 28. It is not necessary to remove material from all these locations to reduce $f_2-f_1$, but it is generally desired to remove material of a pair of locations in order to keep the center of the mass to be at the center of the resonator 20.

To generalize these expressions for a miniature device that has the nth wine-glass mode with one principal stiffness axis located at an angular coordinate of Θ radian (resonance frequency=$f_1$) and the other principal stiffness axis located at an angular coordinate of Θ+π/2n (resonance frequency=$f_2 \cdot f_1 < f_2$), the angular coordinates of where material needs to be removed from on and/or near the surface of the rim 26 to reduce $f_2-f_1$ are: 1) Θ, Θ+π/n, Θ+2π/n . . . , Θ+(2n−1)π/n radians and/or 2) Θ−β/2, Θ+β/2, Θ−β/2+π/n, Θ+β/2+π/n, . . . Θ−β/2+(2n−1)π/n, Θ+β/2+(2n−1)π/n radians, where β is an arbitrary separation angle between 0 and π/4n radians.

6.2 Angular Coordinate for Addition of Material with Micro-Machining Process

For a miniature device that has the nth wine-glass mode with one principal stiffness axis located at an angular coordinate of Θ radian (resonance frequency=$f_1$) and the other principal stiffness axis located at an angular coordinate of Θ+π/2n (resonance frequency=$f_2 \cdot f_1 > f_2$), the angular coordinates of where material needs to be added onto and/or near the surface of the rim 26 to reduce $f_2-f_1$ are: 1) Θ, Θ+π/n, Θ+2π/n . . . , Θ+(2n−1)π/n radians and/or 2) Θ−β/2, Θ+β/2, Θ−β/2+π/n, Θ+β/2+π/n, . . . Θ−β/2+(2n−1)π/n, Θ+β/2+(2n−1)π/n radians, where β is an arbitrary separation angle between 0 and π/4n radians.

Figure 13:
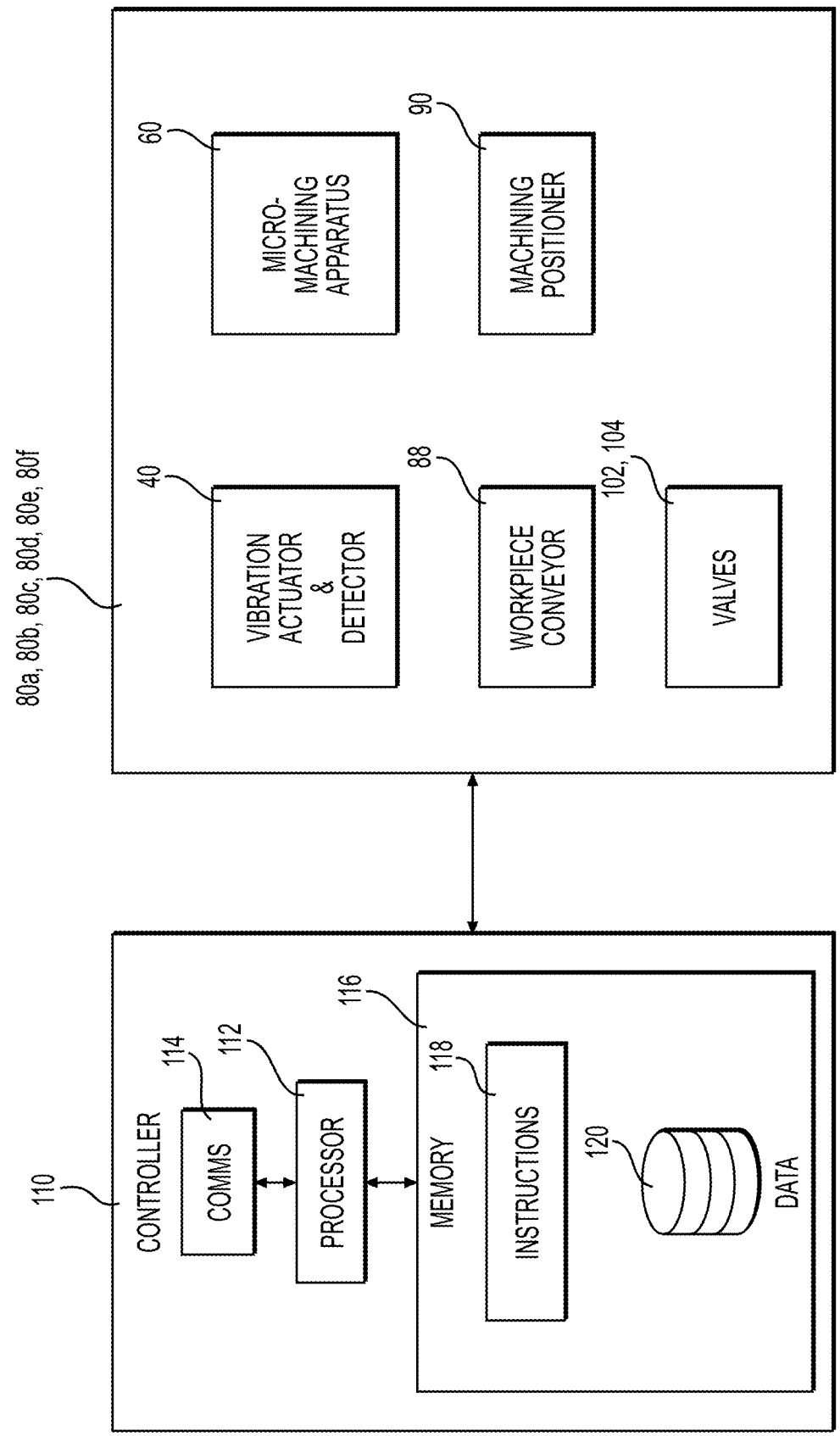
FIG. 13 is a block diagram of a system for measuring and machining one or more miniature electromechanical resonators.

FIG. 13 is a block diagram of a system for measuring and machining one or more miniature electromechanical resonators 20. Specifically, FIG. 13 shows a controller 110 that includes a processor 112 and a communications module 114. The controller 110 also includes a machine-readable storage memory 116, which may be called a "memory" for short, holding instructions 118 for execution by the processor 112 to cause the controller 110 to perform various actions. The memory 116 also stores data 120, such as information regarding measurements of the principal stiffness axes $\theta_{WG1}$, $\theta_{WG2}$ and the wine-glass mode frequencies $f_{WG1}$, $f_{WG2}$ of a miniature electromechanical resonator 20. The controller 110 is in functional communication with the automatic batch-mode micro-machining apparatus 80a, 80b, 80c, 80d, 80e, 80f for monitoring and/or controlling one or more of the vibration actuator/detector 40, the micro-machining apparatus 60, the workpiece conveyor 88, the machining positioner 90, and/or either or both of the valves 102, 104.

7. Fabrication Process Including Micro-Machining Process

Figure 14:
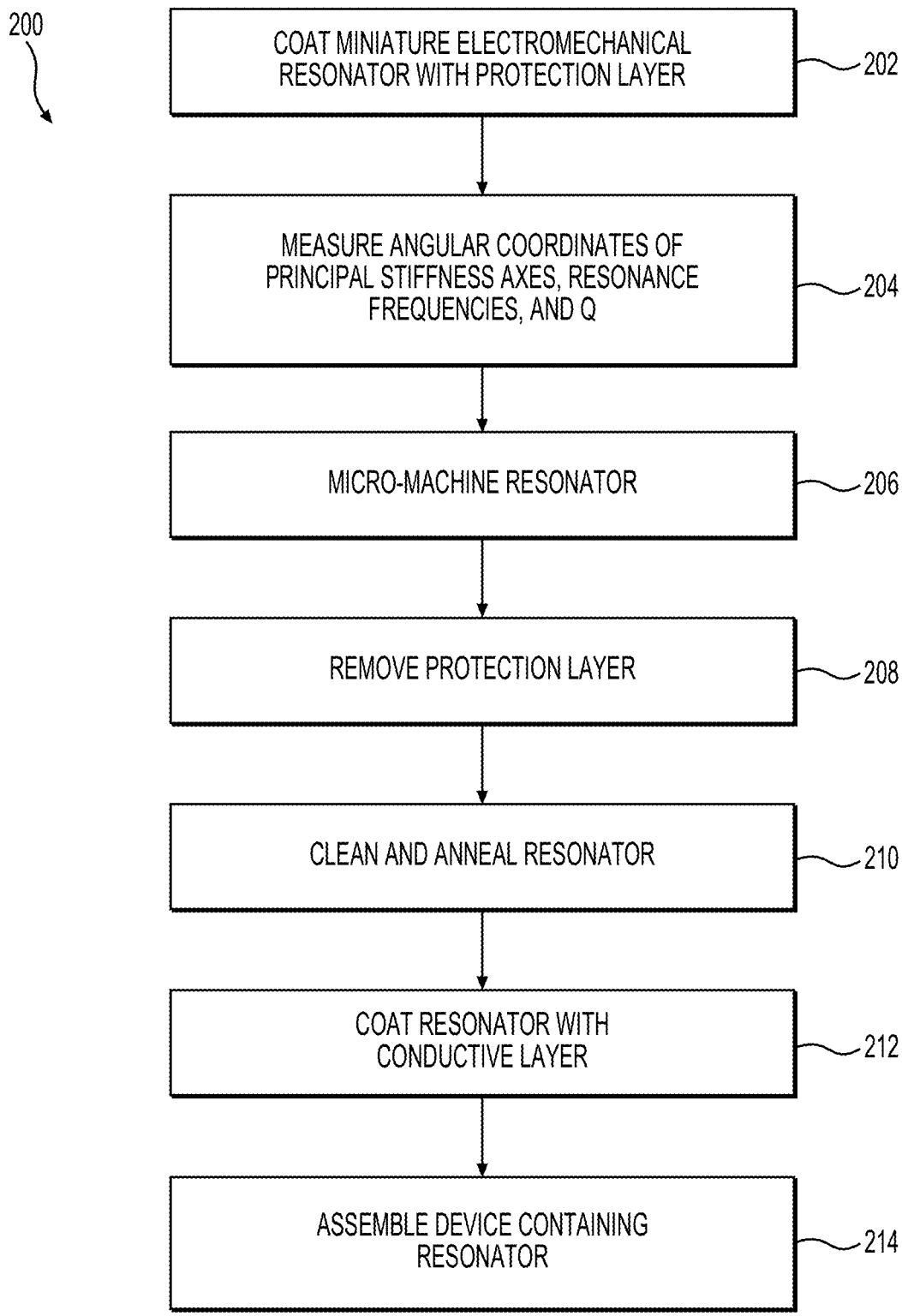
FIG. 14 shows a flow chart of steps in a method for measuring and machining one or more miniature electromechanical resonators in accordance with some embodiments of the present disclosure.

FIG. 14 shows a flow chart of steps in a method 200 for measuring and machining one or more miniature electromechanical resonators 20 in an example micro fabrication process. First, a miniature device 20 is coated with a protection layer at step 202. Examples of materials suitable as protection layers include metal (e.g. Ti, Au, Ag, Al, Ni, Pt, W, Mo), polymer (e.g. photoresist, polyimide, Parylene), semiconductor (e.g. silicon, GaAs), dielectric material (e.g. silicon oxide, silicon nitride), insulating material (e.g. silicon dioxide, glass), and piezoelectric materials (e.g. PZT, AlN), and conductive ceramic material (e.g. indium tin oxide, aluminum doped oxide, fluorine doped tin oxide). The deposition methods for the protection layers include but not limited to thermal evaporation, electronic beam evaporation, sputtering, spin coating, ultrasonic deposition, chemical vapor deposition, and plasma-enhanced chemical vapor deposition. The thickness of a protection layer is typically between a few nanometers to a few 100 micrometers.

Second, the angular coordinates of the principal stiffness axes, resonance frequencies of individual principal stiffness axes, and Q are measured at step 204. Third, material is removed from or added to a resonator 20 using the micro-machining process at step 206. Fourth, the protection layer is removed at step 208. Fifth, the resonator is cleaned and annealed at step 210. Sixth, if the resonator 20 is made is an electrically insulating material, the resonator 20 is coated with a layer of a conductive material at step 212. Seventh, the resonator 20 is assembled with other components of a sensor or an actuator at step 214. For example, the resonator 20 may be combined with actuator and detector electrodes and other circuitry to enable it to function as a miniature vibratory gyroscope.

According to an aspect of the disclosure, an apparatus to remove material from a miniature electromechanical device 20 to change its resonance frequency and quality factor of its mechanical resonance mode is provided.

According to another aspect of the disclosure, an apparatus to remove material from a miniature electromechanical device 20 to change its resonance frequency by changing effective mass and stiffness of the device is provided.

In accordance with some embodiments, the apparatus to remove material contains an ultrasonic transducer with a vibrating frequency of 10-100 kHz and a machining tip. In accordance with some embodiments, the apparatus to remove material contains a machining tip made of a material with a Young's modulus that is substantially equal or lower than the Young's modulus of a material of the miniature electromechanical device 20 to be machined. In accordance with some embodiments, the micro-machining of the miniature electromechanical device 20 is performed in a vacuum or in the atmospheric pressure. In accordance with some embodiments, the apparatus to remove material contains electronic probes to actuate and measure the vibrating motion of the miniature electromechanical device 20. In accordance with some embodiments, the apparatus to remove material includes an optical detector to measure the vibrating motion of the miniature electromechanical device 20.

According to an aspect of the disclosure, an apparatus configured to add material to a miniature electromechanical device 20 to change its resonance frequency and quality factor of its mechanical resonance mode is provided.

According to an aspect of the disclosure, an apparatus to add material to a miniature electromechanical device 20 to change its resonance frequency by changing effective mass and stiffness of the device 20 is provided. In accordance with some embodiments, the apparatus to add material comprises an ultrasonic transducer with a vibrating frequency of 10-100 kHz and a machining tip. In accordance with some embodiments, addition of material to the miniature electromechanical device 20 is performed in vacuum or in the atmospheric pressure. In accordance with some embodiments, the apparatus to add material includes electronic probes to actuate and measure the vibrating motion of a miniature electromechanical device. In accordance with some embodiments, the apparatus to add material includes an optical detector to measure the vibrating motion of the miniature electromechanical device 20.

According to an aspect of the disclosure, a micro-fabrication process that uses an apparatus disclosed herein for creating a miniature electromechanical device 20 is provided.

The system, methods, and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors, or other programmable devices, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of adjusting an operating parameter of a miniature electromechanical resonator, the method comprising:
   measuring an angular coordinate of a first principal stiffness axis of a first wine-glass mode of the miniature electromechanical resonator;
   measuring an angular coordinate of a second principal stiffness axis of a second wine-glass mode of the miniature electromechanical resonator;
   determining a first wine-glass mode frequency of the miniature electromechanical resonator being a resonant frequency of the first principal stiffness axis;
   determining a second wine-glass mode frequency of the miniature electromechanical resonator being a resonant frequency of the second principal stiffness axis;
   calculating one or more locations on the miniature electromechanical resonator for machining to reduce a difference between the first and second wine-glass mode frequencies of the miniature electromechanical resonator; and
   machining the one or more locations on the miniature electromechanical resonator to reduce the difference between the first and second wine-glass mode frequencies of the miniature electromechanical resonator.

2. The method of claim 1, wherein measuring the angular coordinates of the principal stiffness axes of the miniature electromechanical resonator further comprises:
   actuating an actuation location on the miniature electromechanical resonator to vibrate at the first wine-glass mode frequency;
   measuring a radial displacement of the miniature electromechanical resonator at each of a first detector location and a second detector location spaced apart from the first detector location, the first detector location being rotationally spaced apart from the actuation location by an arbitrary non-zero angle, and the two detector locations each being rotationally spaced apart from one another by π/2n radians;

calculating an angular coordinate of the first principal stiffness axis using a ratio of the radial displacement at the first detector location to the radial displacement at the second detector location with the actuation location being vibrated at the first wine-glass mode frequency;

actuating the actuation location on the miniature electromechanical resonator to vibrate at the second wine-glass mode frequency, the second wine-glass mode frequency being higher than the first wine-glass mode frequency; and calculating an angular coordinate of the second principal stiffness axis using a ratio of the radial displacement at the first detector location to the radial displacement at the second detector location with the actuation location being vibrated at the second wine-glass mode frequency.

3. The method of claim 2, wherein measuring the angular coordinates of the principal stiffness axes of the miniature electromechanical resonator further comprises:

associating the wine-glass mode frequencies with corresponding ones of the first principal stiffness axis and the second principal stiffness axis using the ratio of the radial displacements at each of two detector locations.

4. The method of claim 1, wherein machining the one or more locations on the miniature electromechanical resonator comprises adding material to at least one of the one or more locations on the miniature electromechanical resonator.

5. The method of claim 1, wherein machining the one or more locations on the rim of the miniature electromechanical resonator comprises removing material from at least one of the one or more locations on the miniature electromechanical resonator.

6. The method of claim 1, wherein machining the one or more locations on the miniature electromechanical resonator is performed in a vacuum or in a partial vacuum.

7. The method of claim 1, wherein machining the one or more locations on the miniature electromechanical resonator comprises blowing debris from the miniature electromechanical resonator using pressurized gas.

8. The method of claim 1, wherein machining the one or more locations on the miniature electromechanical resonator comprises adding or removing an equal amount of material from two diametrically opposed locations.

9. The method of claim 1, wherein machining the one or more locations on the miniature electromechanical resonator comprises adding or removing material from each of two locations separated from one another by an arbitrary separation angle, the two locations each equally spaced away from a location of a principal stiffness axis.

10. The method of claim 1, further comprising:
coating the miniature electromechanical resonator with a protection layer prior to machining the one or more locations on the miniature electromechanical resonator; and
cleaning the protection layer from the miniature electromechanical resonator after machining the one or more locations on the miniature electromechanical resonator.

11. An apparatus for adjusting an operating parameter of a miniature electromechanical resonator, the apparatus comprising:
a vibration actuator/detector configured to measure locations of a first principal stiffness axis and a second principal stiffness axis of the miniature electromechanical resonator, and to measure wine-glass mode frequencies corresponding to each of the first and second principal stiffness axes; and
a micro-machining apparatus configured to add or remove material from the miniature electromechanical resonator to adjust the operating parameter of the miniature electromechanical resonator.

12. The apparatus of claim 11, wherein the vibration actuator/detector comprises an actuator electrode capacitively coupled with the miniature electromechanical resonator and configured to actuate the miniature electromechanical resonator to vibrate.

13. The apparatus of claim 11, wherein the vibration actuator/detector comprises piezoelectric actuator configured to actuate the miniature electromechanical resonator to vibrate.

14. The apparatus of claim 11, wherein the vibration actuator/detector comprises a plurality of detector electrodes capacitively coupled with the miniature electromechanical resonator and configured to detect vibration of the miniature electromechanical resonator.

15. The apparatus of claim 11, wherein the vibration actuator/detector comprises an optical detector configured to detect vibration of the miniature electromechanical resonator.

16. The apparatus of claim 15, wherein the optical detector comprises a Laser Doppler Velocimeter configured to detect vibration of the miniature electromechanical resonator using the Doppler effect.

17. The apparatus of claim 11, wherein the micro-machining apparatus comprises an ultrasonic transducer configured to vibrate a machining tip, the machining tip configured to contact the miniature electromechanical resonator to add or remove material therefrom.

18. The apparatus of claim 11, wherein the micromachining tip comprises a material having a Young's modulus that is substantially equal to or lower than a Young's modulus of the miniature electromechanical resonator.

19. The apparatus of claim 11, further comprising:
an enclosure containing the micro-machining apparatus and configured to maintain a vacuum or a partial vacuum.

20. The apparatus of claim 11, further comprising:
a workpiece conveyor for batch processing of a plurality of miniature electromechanical resonators; and
wherein the workpiece conveyor is configured to move a selected one of the plurality of miniature electromechanical resonators into an operational position for machining by the micro-machining apparatus or to move the micro-machining apparatus into the operational position for machining the selected one of the plurality of miniature electromechanical resonators.

* * * * *

UNITED STATES PATENT AND TRADEMARK OFFICE
CERTIFICATE OF CORRECTION

| | | |
|---|---|---|
| PATENT NO. | : 11,346,668 B2 | Page 1 of 1 |
| APPLICATION NO. | : 17/118919 | |
| DATED | : May 31, 2022 | |
| INVENTOR(S) | : Jae Yoong Cho | |

It is certified that error appears in the above-identified patent and that said Letters Patent is hereby corrected as shown below:

In the Specification

On Column 1, Line 13, before the "BACKGROUND", please insert the following paragraph:
--GOVERNMENT RIGHTS
This invention was made with Government support under Small Business Innovation Research (SBIR) contract number 1819893 awarded by the National Science Foundation. The Government has certain rights in this invention.--

Signed and Sealed this
Eleventh Day of October, 2022

Katherine Kelly Vidal
*Director of the United States Patent and Trademark Office*